(12) United States Patent
Nishioka et al.

(10) Patent No.: US 6,839,190 B2
(45) Date of Patent: Jan. 4, 2005

(54) OPTICAL APPARATUS AND IMAGING APPARATUS USING THE SAME

(75) Inventors: Kimihiko Nishioka, Hachioji (JP); Dai Kawase, Hino (JP); Masaaki Daigaku, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/627,770

(22) Filed: Jul. 28, 2003

(65) Prior Publication Data

US 2004/0136093 A1 Jul. 15, 2004

(30) Foreign Application Priority Data

Jul. 31, 2002 (JP) .......................... 2002-222328
Aug. 5, 2002 (JP) .......................... 2002-226906
Aug. 29, 2002 (JP) .......................... 2002-249911

(51) Int. Cl.[7] .................. G02B 17/00; G02B 13/16; G02B 26/00; G02B 7/182

(52) U.S. Cl. .................. 359/726; 348/335; 359/292; 359/846

(58) Field of Search .................. 359/291, 292, 359/726, 846; 348/335

(56) References Cited

FOREIGN PATENT DOCUMENTS

| JP | 11-317894 | 11/1999 |
|----|-----------|---------|
| JP | 2000-267010 | 9/2000 |

*Primary Examiner*—David N. Spector
(74) *Attorney, Agent, or Firm*—Westerman, Hattori, Daniels & Adrian, LLP

(57) ABSTRACT

Disclosed herein is an optical apparatus including: a variable configuration mirror unit having a reflecting surface for reflecting incident light and capable of causing change in the configuration of the reflecting surface upon turning on electricity; and a lens for bringing the incident light into an internal part, a mirror holding section for holding the variable configuration mirror unit being formed on the lens.

17 Claims, 23 Drawing Sheets

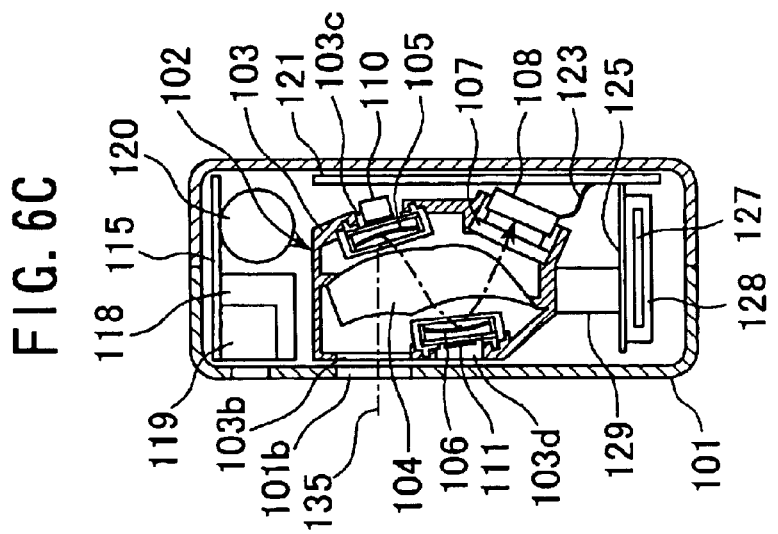
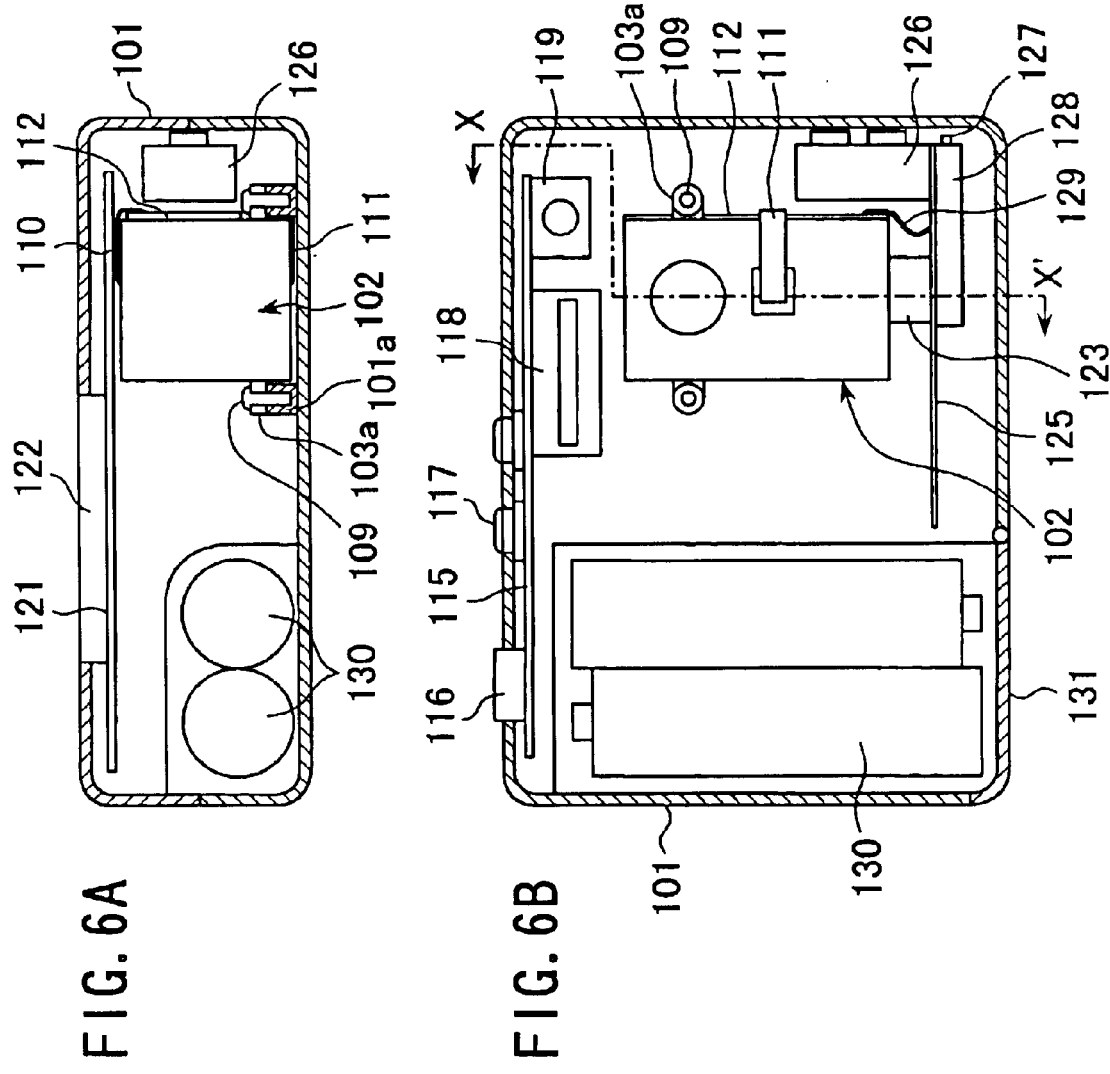

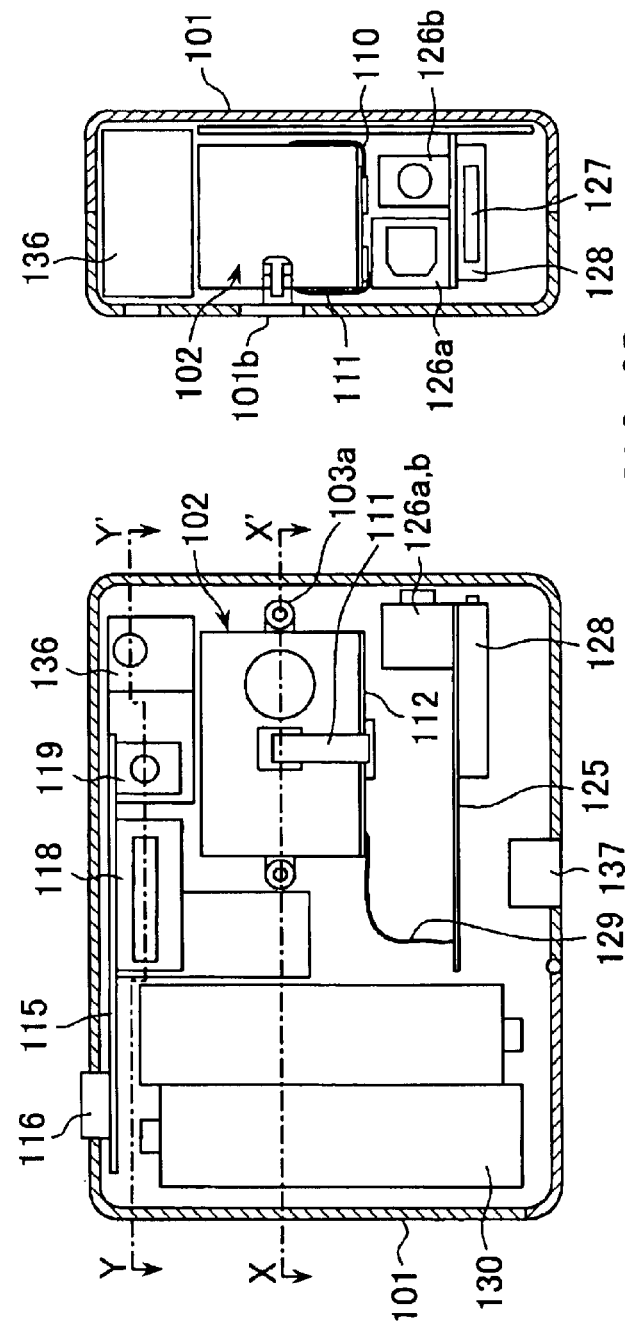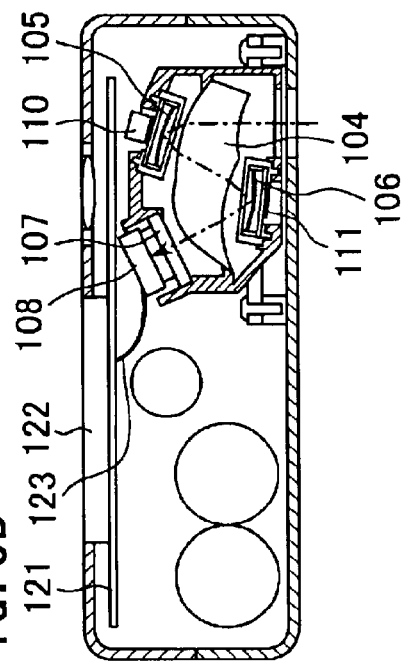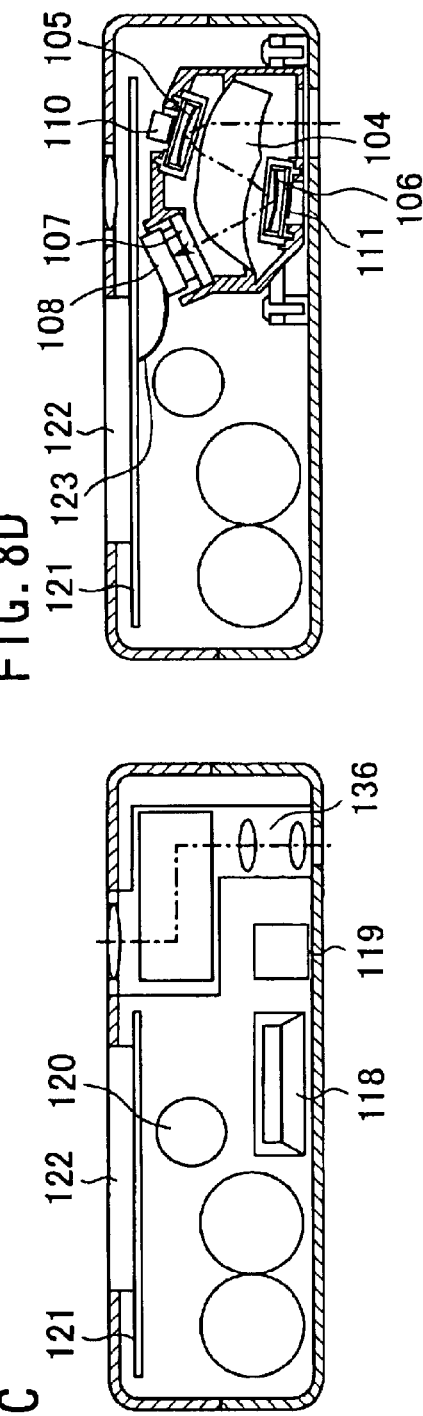

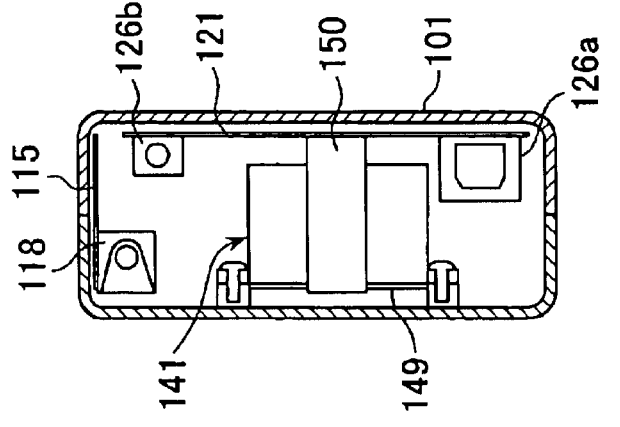
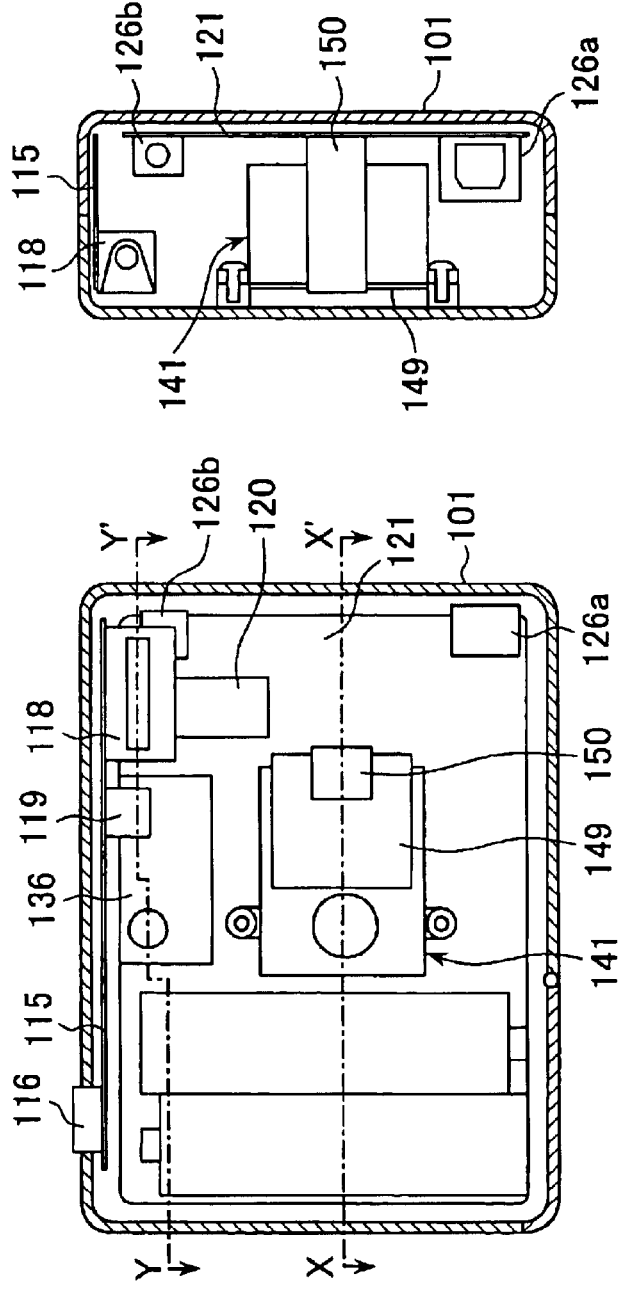
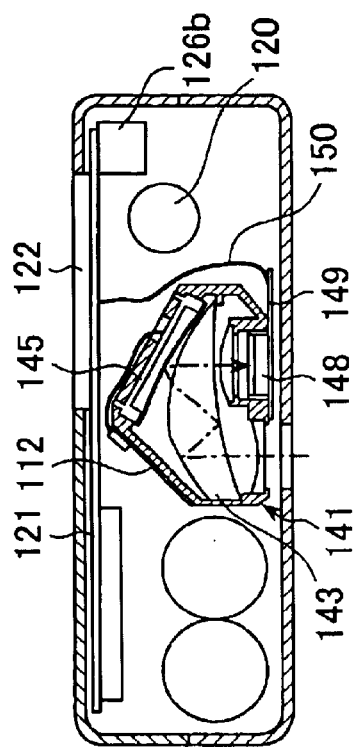
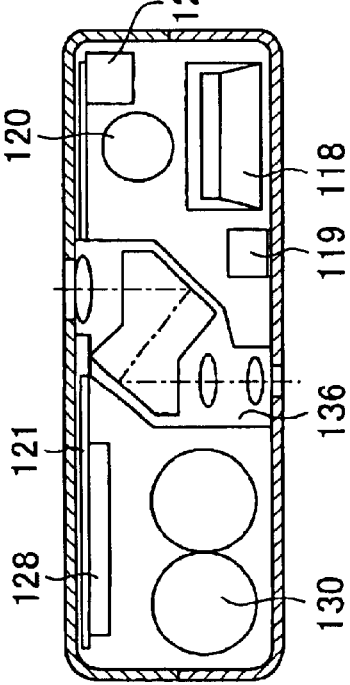

FIG. 17

| OBJECT DISTANCE | | ZOOM CONDITION | | | | | | |
|---|---|---|---|---|---|---|---|---|
| | | WIDE | | | STANDARD | | | TELEPHOTO |
| ↑ | FAR POINT MARGIN | 1*1 | 5*2 | 7*3 | 1.5 | 5.5 | 7.5 | ...... |
| | ∞ | 2 | 6 | 8 | 2.5 | 6.5 | 8.5 | ...... |
| | 2m | 3 | 7 | 9 | 3.5 | 7.5 | 9.5 | ...... |
| ↓ | 0.5m | 4 | 8 | 10 | 4.5 | 8.5 | 10.5 | ...... |
| | NEAR POINT MARGIN | : | | | : | | | ⋱ |

*1: VOLTAGE OF ELECTRODE 1 (V)
*2: VOLTAGE OF ELECTRODE 2 (V)
*3: VOLTAGE OF ELECTRODE 3 (V)

OPTICAL APPARATUS AND IMAGING APPARATUS USING THE SAME

This application claims benefit of Japanese Applications No.2002-222328 filed in Japan on Jul. 31, 2002, No.2002-226906 filed in Japan on Aug. 5, 2002 and No.2002-249911 filed in Japan on Aug. 29, 2002, the contents of which are incorporated by this reference.

BACKGROUND OF THE INVENTION

The present invention relates to optical apparatus using variable optical-characteristic optical devices such as a variable configuration mirror and also relates to imaging apparatus using such optical apparatus.

Generally, the size and performance of an equipment as a whole are likely to depend on its optical system in the types of imaging equipment such as a film camera, digital camera, and video camera, and display equipment and also in a microscope, electronic endoscope, etc. The reduction in size and power consumption is thus always demanded of the optical system not only of the imaging equipment and display equipment but also of each of the above described equipment to improve the performance, especially downsizing and power saving. Such a demand is most intense in the field of digital cameras and camera units of mobile phone, i.e., digital imaging equipment.

While the optical system of some of the above described equipment has been provided with an autofocus function and/or zoom function, these functions are achieved by driving a lens by motor.

As a means for achieving downsizing and power saving of the optical system in which a lens is driven by motor, a variable configuration mirror has disclosed for example in Japanese patent application laid-open Hei-11-317894. Such a variable configuration mirror is constituted by a thin film for forming a reflecting surface and an electrode disposed in a manner facing the thin film. A voltage is applied between the thin film and the electrode to change a curved shape of the thin film of the reflecting surface by electrostatic force so that its focal length can be adjusted. The variable configuration mirror is smaller in size and lower in power consumption as compared to the conventional motor-driven optical system and is characterized in that it does not cause a motor drive sound or noise in its transmission system.

Further, Japanese patent application laid-open No.2000-267010 discloses variable optical-characteristic optical devices such as a variable focal lens and variable prism in addition to the above described variable configuration mirror, which are of special construction unlike those conventional optical component parts made of glass or plastic and have optical characteristics that are variable by an electrical control.

SUMMARY OF THE INVENTION

It is an object of the present invention to provide an optical apparatus effectively using characteristic of a variable configuration mirror and to provide an imaging apparatus in which such optical apparatus is used to achieve a reduction in size.

It is another object of the invention to provide an optical apparatus consuming less power and having relatively smaller size/weight in which a variable optical characteristic optical device such as a variable configuration mirror or variable focal lens is provided so that, in parallel to autofocus, other functions can be suitably effected, and also to provide an imaging apparatus using such optical apparatus.

In a first aspect of the invention, there is provided an optical apparatus including: a variable configuration mirror unit having a reflecting surface for reflecting incident light and capable of causing change in the configuration of the reflecting surface upon turning on electricity; and a lens for bringing the incident light into an internal part. A mirror holding section for holding the variable configuration mirror unit is formed on the lens.

The optical apparatus according to the first aspect may employ a construction including an imaging device for photoelectrically converting light transmitted through the lens, wherein an imaging device holding section for holding the imaging device is additionally formed on the lens.

The optical apparatus according to the first aspect may employ a construction where the lens is a prism having a free curved surface formed at least partially thereon.

The optical apparatus according to the first aspect may employ a construction where the variable configuration mirror unit is held on the lens so that the reflecting surface thereof is concealed from outside.

The optical apparatus according to the first aspect may employ a construction further including a casing for protecting at an interior thereof the lens and the variable configuration mirror unit held on the lens, wherein the lens is formed with a portion abutting against the casing.

The optical apparatus according to the first aspect may employ a construction where the lens is formed with a mounting portion for mounting onto an imaging apparatus to which the optical apparatus is applied.

The optical apparatus according to the first aspect may employ a construction where the variable configuration mirror unit adjusts focusing position of the incident light according to the configuration of the reflecting surface.

The optical apparatus according to the first aspect may employ a construction where the variable configuration mirror unit adjusts zoom ratio according to the configuration of the reflecting surface.

In a second aspect of the invention, there is provided an imaging apparatus having an optical apparatus for imaging, the optical apparatus including: a first and second variable configuration mirrors each capable of being changed in the configuration of a reflecting surface thereof upon turning on electricity; a free curved surface prism having two opposite surfaces thereof serving as optical surface; and an imaging device for receiving light introduced by the first and second variable configuration mirrors and the free curved surface prism. The first variable configuration mirror for reflecting light incident on the front side of the imaging apparatus body is provided on a first optical surface of the optical surfaces of the free curved surface prism facing the rear side of the imaging apparatus body, and the second variable configuration mirror for further reflecting the reflected light by the first variable configuration mirror is provided on a second optical surface of the optical surfaces of the free curved surface prism facing the front side of the imaging apparatus body. The imaging device for receiving the reflected light by the second variable configuration mirror is provided on the first optical surface of the free curved surface prism side by side in an up and down direction with the first variable configuration mirror.

The imaging apparatus according to the second aspect may employ a construction where at least one of the first and second variable configuration mirrors is provided so that the plane containing an outer periphery of the reflecting surface thereof is substantially vertical to the bottom plane of the imaging apparatus body.

The imaging apparatus according to the second aspect may employ a construction where the imaging surface of the imaging device is disposed in a manner inclined toward a vertical direction with respect to the bottom plane of the imaging apparatus body.

The imaging apparatus according to the second aspect may employ a construction where an electrical board is provided between the imaging device and an outer armor on the rear side of the imaging apparatus body.

The imaging apparatus according to the second aspect may employ a construction where an electrical board having a driving circuit of at least one of the first and second variable configuration mirrors thereon is provided on the free curved surface prism on the side without an optical surface being formed.

In a third aspect of the invention, there is provided an imaging apparatus having an optical apparatus for imaging, the optical apparatus including: a variable configuration mirror capable of being changed in the configuration of a reflecting surface thereof upon turning on electricity; a free curved surface prism having two opposite surfaces thereof serving as optical surface; and an imaging device for receiving light introduced by the variable configuration mirror and the free curved surface prism. The variable configuration mirror for reflecting light incident on the front side of the imaging apparatus body is provided on a first optical surface of the optical surfaces of the free curved surface prism facing the rear side of the imaging apparatus body. The imaging device for receiving the reflected light by the variable configuration mirror is provided on a second optical surface facing the front side of the imaging apparatus body.

The imaging apparatus according to the third aspect may employ a construction where the imaging surface of the imaging device is disposed substantially vertical to the bottom plane of the imaging apparatus body.

In a fourth aspect of the invention, there is provided an imaging apparatus having an optical apparatus for imaging, the optical apparatus including: a first and second variable configuration mirrors each capable of being changed in the configuration of a reflecting surface thereof upon turning on electricity; a lens; and an imaging device for effecting photoelectric conversion of light formed into an image by the first and second variable configuration mirrors and the lens. A light incident on the front side of the imaging apparatus body is reflected substantially vertically by the first variable configuration mirror, and the reflected light by the first variable configuration mirror is further reflected toward the rear side of the imaging apparatus body by the second variable configuration mirror. At the same time, the imaging device for receiving the reflected light by the second variable configuration mirror is provided so as to be at the rear side of the imaging apparatus body.

In a fifth aspect of the invention, there is provided an imaging apparatus having an optical apparatus for imaging, the optical apparatus including: a first and second variable configuration mirrors each capable of being changed in the configuration of a reflecting surface thereof upon turning on electricity; a lens; and an imaging device for effecting photoelectric conversion of light formed into an image by the first and second variable configuration mirrors and the lens. A light incident on the front side of the imaging apparatus body is reflected substantially vertically by the first variable configuration mirror, and the reflected light by the first variable configuration mirror is further reflected toward the front side of the imaging apparatus body by the second variable configuration mirror. At the same time, the imaging device for receiving the reflected light by the second variable configuration mirror is provided so as to be at the front side of the imaging apparatus body.

The imaging apparatus according to the fifth aspect may employ a construction where the imaging surface of the imaging device is disposed so as to be substantially vertical to the bottom plane of the imaging apparatus body.

The imaging apparatus according to any one of the fourth and fifth aspects may employ a construction where the lens is provided in the optical path between the first and second variable configuration mirrors.

In a sixth aspect of the invention, there is provided an imaging apparatus having an optical apparatus for imaging, the optical apparatus including: a first and second variable configuration mirrors each capable of being changed in the configuration of a reflecting surface thereof upon turning on electricity; a free curved surface prism having two opposite surfaces thereof serving as optical surface; and an imaging device for receiving light introduced by the first and second variable configuration mirrors and the free curved surface prism. The first variable configuration mirror is disposed so as to reflect light incident on the front side of the imaging apparatus body onto a first optical surface of the optical surfaces of the free curved surface prism facing the rear side of the imaging apparatus body. The second variable configuration mirror is disposed onto the first optical surface so that the light reflected by the first variable configuration mirror and then further reflected by a second optical surface of the optical surfaces of the free curved surface prism facing the front side of the imaging apparatus body is reflected toward the front of the imaging apparatus body. The imaging device is disposed so as to receive the reflected light reflected onto the second optical surface by the second variable configuration mirror.

The imaging apparatus according to any one of the second, third, fourth, fifth, and sixth aspects may employ a construction where the optical apparatus is disposed so that the plane containing the incident optical axis to the optical apparatus and the incident optical axis to the imaging device is vertical to the bottom plane of the imaging apparatus body.

The imaging apparatus according to any one of the second, third, fourth, fifth, and sixth aspects may employ a construction where the optical apparatus is disposed so that the plane containing the incident optical axis to the optical apparatus and the incident optical axis to the imaging device is parallel to the bottom plane of the imaging apparatus body.

The imaging apparatus according to any one of the second, third, fourth, fifth, and sixth aspects may employ a construction where the variable configuration mirror adjusts a focusing position by the configuration of the reflecting surface.

The imaging apparatus according to any one of the second, fourth, fifth, and sixth aspects may employ a construction where the variable configuration mirror adjusts optical power by the configuration of the reflecting surface.

In a seventh aspect of the invention, there is provided an imaging apparatus including: a variable optical characteristic optical device capable of varying optical characteristic upon turning on electricity; zoom lens; and an imaging device for photoelectrically converting incident light transmitted through the variable optical characteristic optical device and the zoom lens. The adjustment of the focusing position of the incident light by the variable optical characteristic optical device and zoom adjustment by the zoom lens are concurrently effected.

The imaging apparatus according to the seventh aspect may employ a construction where the adjustment of the focusing position and the zoom adjustment are concurrently effected when taking dynamic images.

The imaging apparatus according to the seventh aspect may employ a construction where the adjustment of the focusing position and the zoom adjustment are concurrently effected when taking static images.

In an eighth aspect of the invention, there is provided an imaging apparatus including: a variable optical characteristic optical device capable of varying optical characteristic upon turning on electricity; an imaging device for photoelectrically converting incident light transmitted through the variable optical characteristic optical device; a microphone for converting sound into electrical signals; and a recording section for recording image pickup signals from the imaging device and sound signals from the microphone. An image taking with containing sound is effected while adjustment of the focusing position of the incident light or zoom adjustment is effected by the variable optical characteristic optical device.

The imaging apparatus according to the eighth aspect may employ a construction where the image taking with containing sound is the taking of dynamic images with containing sound.

The imaging apparatus according to the eighth aspect may employ a construction where the image taking with containing sound is the taking of static image with containing sound.

In a ninth aspect of the invention, there is provided an imaging apparatus including: a variable optical characteristic optical device capable of varying optical characteristic upon turning on electricity; an imaging device for photoelectrically converting incident light transmitted through the variable optical characteristic optical device; and a display device for displaying image pickup signals obtained from the imaging device as an image. The adjustment of the focusing position of the incident light by the variable optical characteristic optical device is effected while displaying taken image on the display device.

In a tenth aspect of the invention, there is provided an imaging apparatus including: a variable optical characteristic optical device capable of varying optical characteristic upon turning on electricity; an imaging device for photoelectrically converting incident light transmitted through the variable optical characteristic optical device; and a display device for displaying image pickup signals obtained from the imaging device as an image.

If adjustment of the focusing position of the incident light by the variable optical characteristic optical device is not effected during displaying of taken image on the display device, the variable optical characteristic optical device is set so as to be focused to infinity or to a far distance.

In an eleventh aspect of the invention, there is provided an optical apparatus including a variable optical characteristic optical device capable of varying optical characteristic upon turning on electricity, adjustment of the focusing position of incident light being effected by the variable optical characteristic optical device, wherein standard image taking through macro image taking can be effected without switching to a macro mode.

In a twelfth aspect of the invention, there is provided an optical apparatus including: a variable optical characteristic optical device capable of varying optical characteristic upon turning on electricity; and a charging type battery for turning on electricity to the variable optical characteristic optical device. The charging type battery is disposed within the body of the optical apparatus in a manner incorporated into the apparatus body.

The optical apparatus according to the twelfth aspect may employ a construction where a charging contact of the charging type battery is provided on an outer surface of the body of the optical apparatus.

The optical apparatus according to the twelfth aspect may employ a construction where the charging type battery disposed in the manner incorporated into the apparatus body is disposed so that the act of its exchange cannot be done by the user.

In the imaging apparatus according to any one of the seventh to tenth aspects, the variable optical characteristic optical device is preferably a variable focal lens.

In the optical apparatus according to any one of the eleventh and twelfth aspects, the variable optical characteristic optical device is preferably a variable focal lens.

In the imaging apparatus according to any one of the seventh to tenth aspects, the variable optical characteristic optical device is preferably a variable configuration mirror having a reflecting surface for reflecting incident light and capable of being changed in the configuration of the reflecting surface upon turning on electricity.

In the optical apparatus according to any one of the eleventh and twelfth aspects, the variable optical characteristic optical device is preferably a variable configuration mirror having a reflecting surface for reflecting incident light and capable of being changed in the configuration of the reflecting surface upon turning on electricity.

BRIEF DESCRIPTION OF THE DRAWINGS

FIGS. 6A to 6C show a third embodiment of the invention.

FIGS. 8A to 8D show a modification of the third embodiment shown in FIGS. 6A to 6C.

FIGS. 10A to 10D show a modification of the fourth embodiment shown in FIGS. 9A to 9D.

FIG. 17 shows a specific example of look-up table shown in FIG. 16.

DESCRIPTION OF THE PREFERRED EMBODIMENTS

Figure 1A:
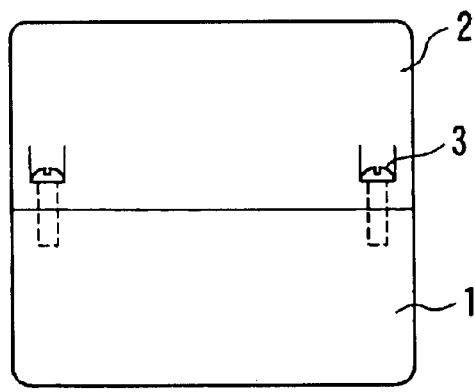
FIGS. 1A to 1D schematically show a first embodiment of the optical apparatus according to the invention.
Figure 1C:
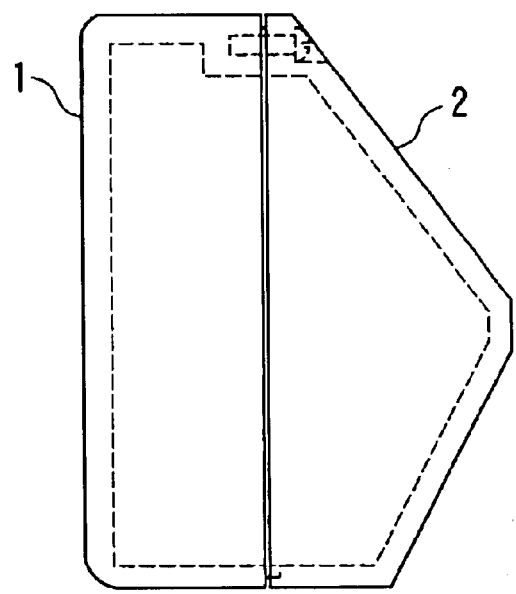
Figure 1B:
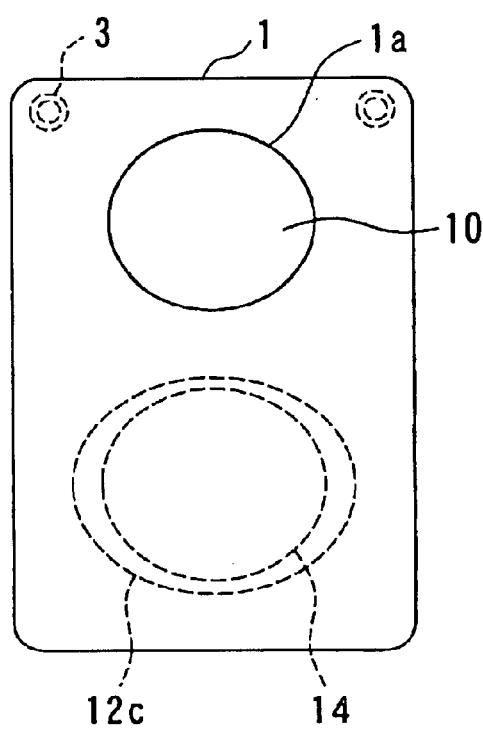
Figure 1D:
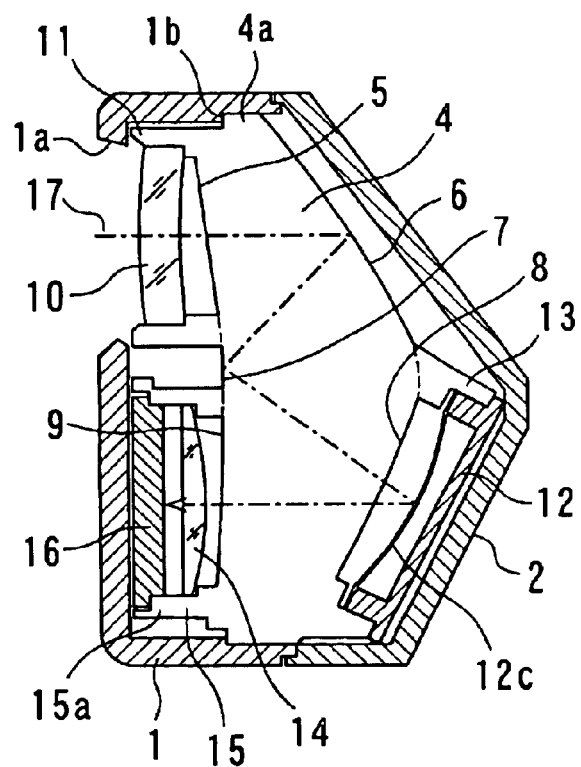

Some embodiments of the invention will now be described. FIGS. 1A to 1D schematically show a first embodiment of the optical apparatus according to the invention. FIG. 1A is a top view; FIG. 1B is a front view; FIG. 1C is a side view; and FIG. 1D is a sectional side view. In this embodiment, the optical apparatus according to the invention is applied to an optical system of imaging device which, as shown in the figures, includes a front casing 1 and rear casing 2 having a function as lens frame for protecting internal members. The front casing 1 has a lens opening 1a, and the front casing 1 and rear casing 2 are suitably coupled to each other for example by screw 3. Retained within the two casings 1, 2 thus coupled to each other is a free curved surface prism 4 in a manner engaged at a step 4a provided on a periphery thereof with an inside step 1b formed on the front casing 1.

The free curved surface prism 4 is provided with five free curved surfaces (optical surfaces). In particular, a first optical surface 5 is provided on an upper front portion thereof, a second optical surface 6 on an upper rear portion, a third optical surface 7 on a center front portion, a fourth optical surface 8 on a lower rear portion, and a fifth optical surface 9 on a lower front portion, respectively. A first lens (concave lens) 10 is attached to the first optical surface 5 in a manner facing thereto and with a separation therefrom by the means of a lens hold 11 which is monolithically projected from the free curved surface prism 4 at an outer periphery of the first optical surface 5. The first lens 10 is disposed so that it is exposed to the outside through the lens opening 1a.

A variable configuration mirror 12 is attached to the fourth optical surface 8 of the free curved surface prism 4 in a manner facing thereto and with a separation therefrom by the means of a mirror hold 13 which is also monolithically projected from the free curved surface prism 4 at an outer periphery of the fourth optical surface 8 so that the mirror body surface of the variable configuration mirror 12 is concealed from outside. Further, a second lens (convex lens) 14 is attached to the fifth optical surface 9 of the free curved surface prism 4 in a manner facing thereto with a separation therefrom by the means of a lens hold 15 which is also monolithically projected from the free curved surface prism 4 at an outer periphery of the fifth optical surface 9. Furthermore, an imaging device hold 15a is monolithically formed on a projected extension of the lens hold 15, and an imaging device 16 is disposed on the imaging device hold 15a in a manner facing and with a separation from the second lens 14.

Figure 2A:
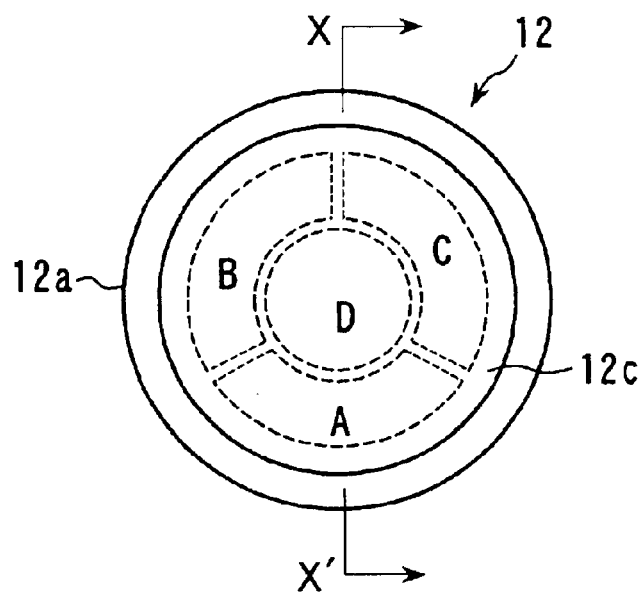
FIGS. 2A and 2B show construction in detail of a variable configuration mirror in the first embodiment shown in FIGS. 1A to 1D.
Figure 2B:
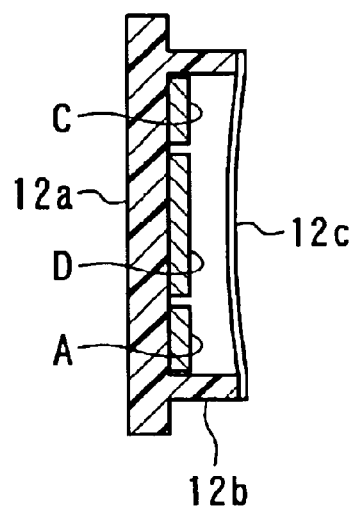

A description will now be given by way of FIGS. 2A and 2B with respect to a detailed construction of the variable configuration mirror disposed in a manner facing the fourth optical surface 8 of the free curved surface prism 4. FIG. 2A is a top view and FIG. 2B is a sectional view along line X–X' in FIG. 2A. As shown in FIGS. 2A and 2B, the variable configuration mirror 12 is constructed such that a ring-like support wall 12b is projected on one side of the a disk-like board 12a so that fixed electrodes consisting of three peripheral electrodes A, B, C and one center electrode D are disposed within a region surrounded by the ring-like support wall 12b. At the same time a peripheral portion of the mirror body 12c is jointed and fixed to the opening end of the ring-like support wall 12b.

It should be noted that the pattern of the fixed electrodes is not limited to the one illustrated and those of various forms can be suitably used.

The three peripheral electrodes A, B, C each are of a circular arc electrode plate provided substantially within every 120-degree angular range. The center electrode D is formed of a disk-like electrode plate disposed within a circular region occurring at the center of the above described three peripheral electrodes A, B, C. The mirror body 12c is constructed for example by adhering aluminum serving as both movable electrode and reflecting material (mirror surface) onto an outer surface of a disk formed of a polyimide resin. The configuration of the mirror body is not limited to a circular form and an oval may also be used.

In thus constructed variable configuration mirror 12, when a predetermined voltage is applied between the fixed electrodes (A to D) and the movable electrode (mirror body 12c), the curved shape of the reflecting surface (mirror body 12c) is variably controlled by electrostatic force thereof. If for example the voltage of the same level commonly applied to each of the electrodes A to D is gradually increased, the curvature of the mirror body 12c is gradually increased by the electrostatic force which is intensified as the increase in the applied voltage.

Figure 3:
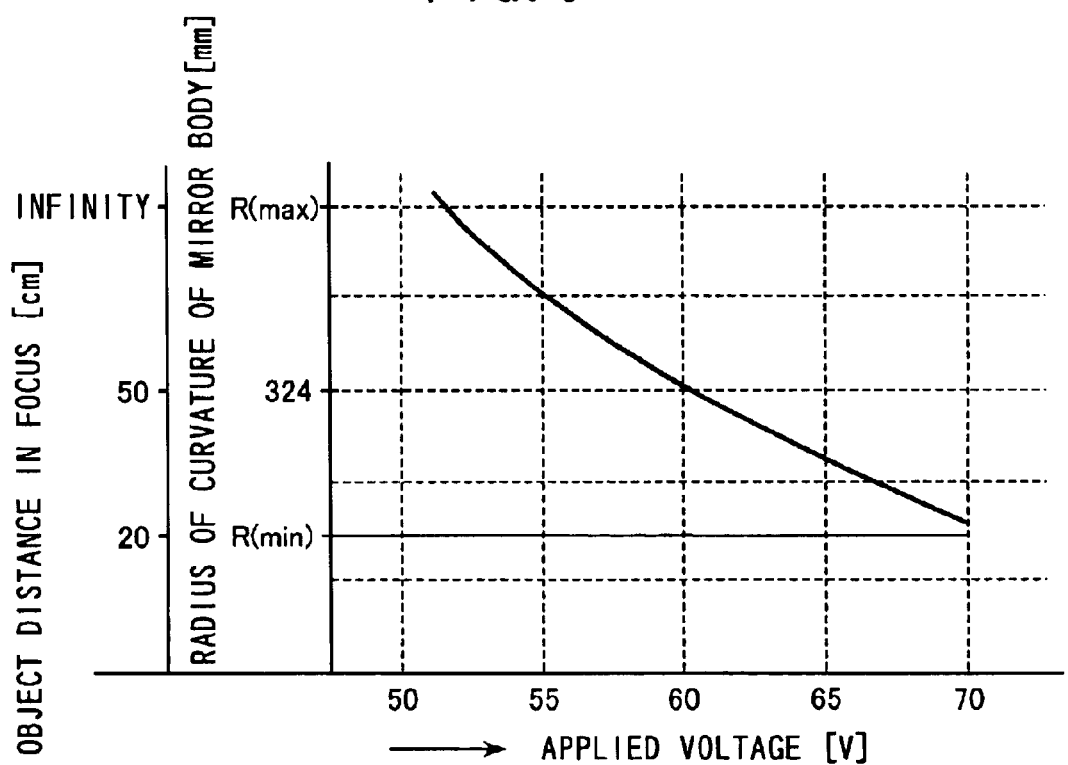
FIG. 3 shows an example of curve characteristic of a mirror body with respect to application voltage on the variable configuration mirror shown in FIGS. 2A and 2B.

FIG. 3 shows a specific example of the curve characteristic with respect to the applied voltage. As shown in FIG. 3, the radius of curvature of the mirror body 12c is gradually decreased with the increase in the applied voltage so that the object distance in focus gradually becomes shorter. If for example the applied voltage is set to 60V, the radius of curvature of the mirror body 12c is 324 mm and the object distance in focus becomes 50 cm.

The operation of the present embodiment using thus constructed variable configuration mirror 12 will now be described. An axial light ray 17 incident on the first lens 10 through the lens opening 1a of the front casing 1 is transmitted through the first optical surface 5 of the free curved surface prism 4 and reaches and is reflected on the second optical surface 6. The reflected light therefrom further reaches the third optical surface 7 to be reflected again. The reflected light from the third optical surface 7 is exitted toward the fourth optical surface 8 and transmitted through the fourth optical surface 8 so as to reach and be reflected on a mirror surface of the mirror body 12c of the variable configuration mirror 12. The reflected light therefrom is transmitted through the fourth optical surface 8 again and further transmitted through the fifth optical surface 9 and the second lens 14 so as to be incident on the imaging device 16. At this time, the application voltage to the variable configuration mirror 12 is adjusted to change the radius of curvature thereof so that adjustment to the object distance is effected to form an image in focus on the imaging device 16.

By thus constructing the optical system as a combination of the variable configuration mirror 12, the free curved surface prism 4 having a plurality of optical surfaces, and ordinary lenses, the size of the optical system, i.e., the optical apparatus can be reduced. At the same time, focusing on the imaging device 16 can be readily executed without causing a driving sound or the like and at less power consumption by adjusting the application voltage to the variable configuration mirror.

Figure 4A:
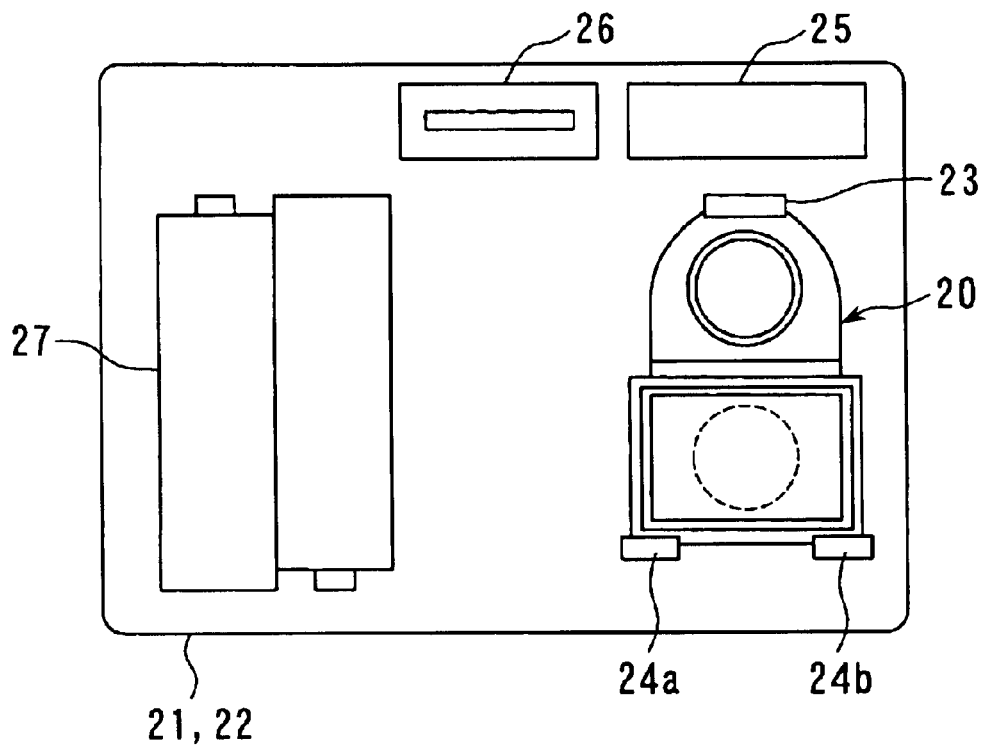
FIGS. 4A and 4B schematically show a second embodiment of the invention.
Figure 4B:
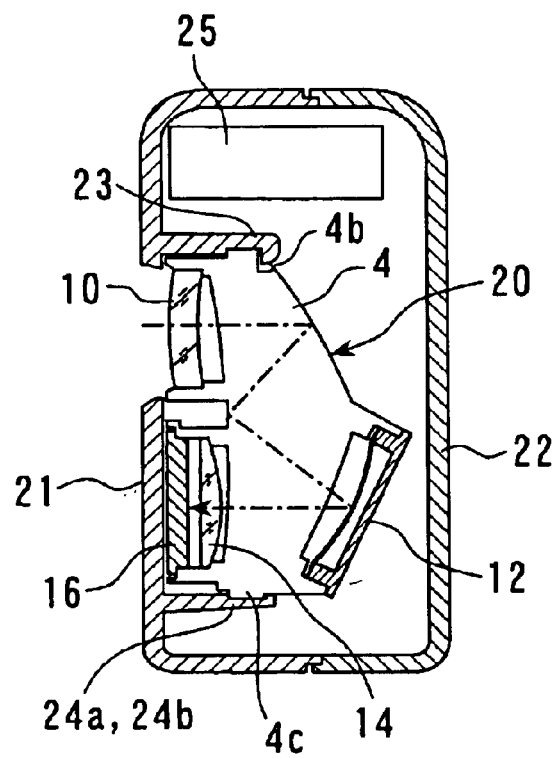

A second embodiment will now be described by way of FIGS. 4A and 4B. FIG. 4A is a schematic front view showing the second embodiment with partially removing a front cover thereof, and FIG. 4B is a sectional side view. In this embodiment, an optical system for imaging device combining a variable configuration mirror, ordinary lenses, and an imaging device into a free curved surface prism of similar construction as the first embodiment is directly attached to a camera body.

Figure 5A:
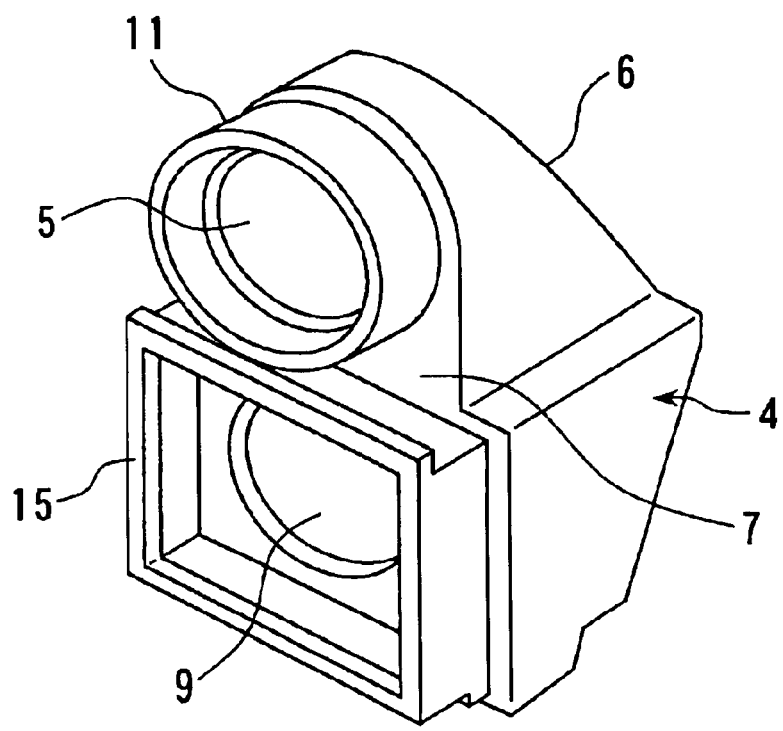
FIGS. 5A and 5B each are a perspective view showing the construction of a free curved surface prism in the second embodiment shown in FIGS. 4A and 4B.
Figure 5B:
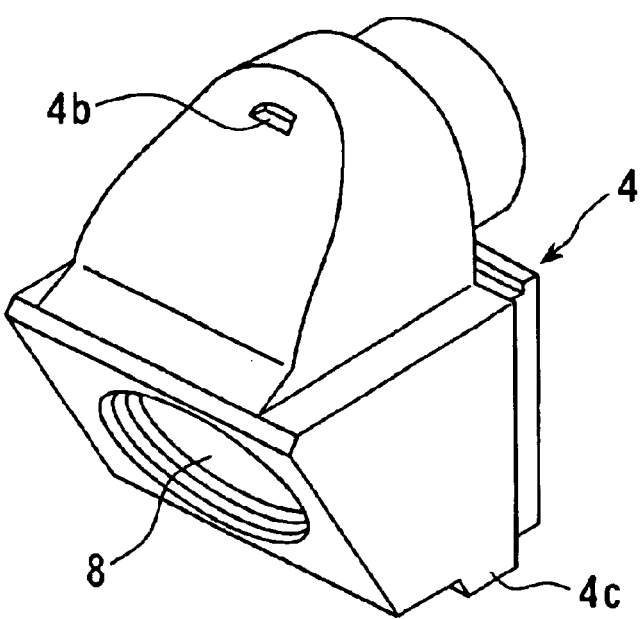

First, as shown in the front and rear perspective views of FIGS. 5A and 5B, a free curved surface prism 4 having first to fifth optical surfaces 5, 6, 7, 8, 9, first and second lens holds 11, 15 and in addition an engaging concave portion 4b and an engaging projecting step portion 4c formed thereon is used to construct an optical system 20 for imaging device by attaching first and second lenses 10, 14, variable configuration mirror 12, and imaging device 16 respectively by way of the holders in a similar manner as the first embodiment.

The optical system 20 is then placed at the interior of the body of an electronic camera formed of a front cover 21 and a rear cover 22. The engaging concave 4b and the engaging projecting step 4c formed on the free curved surface prism 4 of the optical system 20 are engaged with an upper pawl section 23 formed in a manner monolithically projecting from the inner side of the front cover 21 and two lower pawls 24a, 24b also formed in a manner monolithically projecting therefrom to directly attach the optical system 20 to the camera body. It should be noted that FIGS. 4A and 4B include: 25, an optical finder disposed at the interior of the camera body; 26, a flash mechanism disposed also at the interior of the camera body; and 27, battery held within the camera body.

By such construction, a downsized optical system consisting of a free curved surface prism retaining a variable configuration mirror, etc., can be directly and readily positioned and attached to the front cover of the camera body so that a reduction in the size of the electronic camera is achieved.

It should be noted that the above first and second embodiments have been shown as those in which one variable configuration mirror is combined with the free curved surface prism so as to effect focusing by adjustment of the mirror body of the variable configuration mirror based on the applied voltage. By contrast, as will be described in the next embodiment, it is possible to combine two variable configuration mirrors into the free curved surface prism so that zoom adjustment of the optical system can be effected by adjusting the change in the configuration of the mirror surface of one variable configuration mirror from a flat plate to concave and the mirror surface of the other variable configuration mirror in the opposite direction from a concave to flat plate by adjustment of the application voltage.

Further, the variable configuration mirror in the first and second embodiments has been shown as one to be driven by electrostatic force. In addition to the one driven by electrostatic force, such as one driven by electromagnetic force produced by a magnet and a current passed through the reflecting deforming surface to be described later in detail, and one to be deformed by piezoelectric effect by using a piezoelectric material for the reflecting deforming surface can also be used as the variable configuration mirror. Further, while the case of using the optical apparatus according to the invention as an optical system of imaging apparatus has been described, it is not limited to this and a similar construction can be applied also to the optical system of other optical apparatus such as a finder or projector.

A third embodiment will now be described. In this embodiment, the optical apparatus according to the invention is applied to a digital camera serving as an imaging apparatus. FIG. 6A is a sectional top view; FIG. 6B is a sectional front view; and FIG. 6C is a sectional side view along line X–X' of FIG. 6B. Referring to FIGS. 6A to 6C, numeral 101 denotes an apparatus body. A lens unit 102 is disposed within the outer covering of the apparatus body 101, and the lens unit 102 is provided with a lens cover 103. The lens unit 102 includes: a free curved surface prism 104 disposed within the lens cover 103; a first variable configuration mirror 105 disposed in a manner facing a rear side upper lens surface (an upper portion of first optical surface facing toward the rear side of the apparatus body) of the free curved surface prism 104; a second variable configuration mirror 106 disposed in a manner facing a front side lower lens surface (a second optical surface facing toward the front side of the apparatus body) also of the free curved surface prism 104; and an imaging device 108 having an optical filter 107 disposed in a manner facing a rear side lower lens surface (a lower portion of first optical surface facing toward the rear side of the apparatus body) also of the free curved surface prism 104. The lens unit 102 is attached and fixed to a boss 101a of the apparatus body 101 by screw 109 by way of a flange 103a formed as a projection on a side wall of the lens cover 103.

Figure 7:
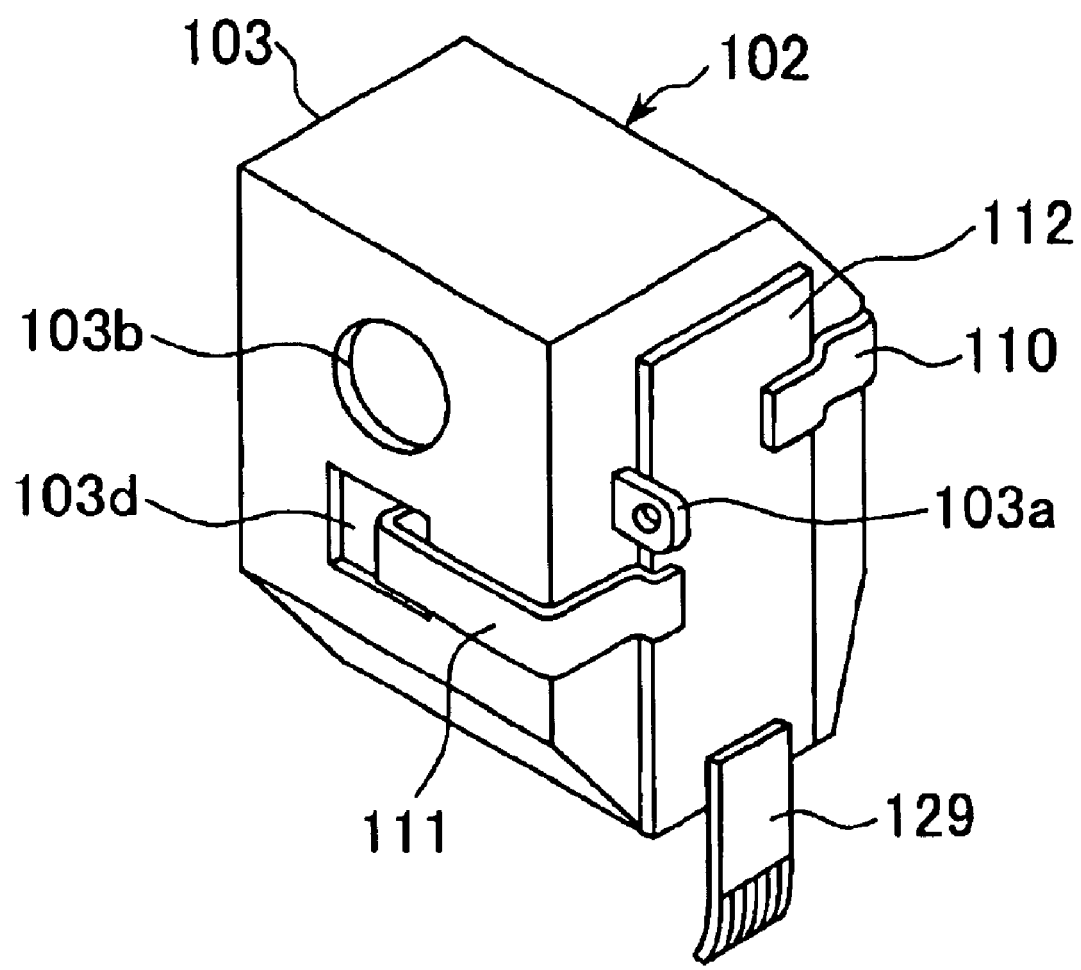
FIG. 7 is an enlarged perspective view showing construction of the lens unit portion in the third embodiment shown in FIGS. 6A to 6C.

A transparent plate 103b is provided on the lens cover 103 of the lens unit 102 at a portion facing a front side upper lens surface of the free curved surface prism 104, and a transparent plate 101b is provided also on the apparatus body at a portion facing the transparent plate 103b. Provided also on the lens cover 103 of the lens unit 102 as shown in FIG. 7 are: a flexible board opening 103c for bringing out a first mirror flexible board 110 connected to the first variable configuration mirror 105; and a flexible board slit 103d for bringing out a second mirror flexible board 111 connected to the second variable configuration mirror 106. The other ends respectively of the first and second mirror flexible boards 110, 111 are each connected to a mirror board 112 disposed on a side surface also of the lens cover 103, i.e, the side toward which a lens surface of the free curved surface prism 104 is not formed. It should be noted that such as a variable configuration mirror drive circuit and temperature compensating sensor are mounted on the mirror board 112.

A top side board 115 is disposed at an upper portion of the interior of the apparatus body 101. A release button 116, an operation switch 117, a strobe unit 118 having xenon tube, a microphone unit 119, and a strobe capacitor 120 are attached onto the top side board 115, and in addition such as a microphone circuit and strobe circuit are formed thereon.

A rear side board 121 is disposed toward the rear side within the apparatus body 101. An image display apparatus 122, CPU, memory (not shown), etc., are provided on the rear side board 121, and in addition such as an imaging circuit and image processing circuit are formed thereon. Of an imaging device flexible board 123 connected to the imaging device 108, the other end is connected to the rear side board 121.

Furthermore, a bottom side board 125 is disposed at a bottom portion within the apparatus body 101. An input/output jack unit 126 such as DC power supply input terminal and IF jack (USB), and media connector 128 for connecting recording media 127 are provided on the bottom side board 125, and in addition such as media I/F circuit and power supply circuit are formed thereon. Of a flexible board 129 for a mirror board connected to the mirror board 112, the other end is connected to the bottom side board 125. It should be noted that, in FIG. 6, numeral 130 denotes a battery held at the interior of the apparatus body 101 and 131 denotes a battery lid for inserting/extracting battery.

It should be noted that the first and second variable configuration mirrors 105, 106 attached to the lens cover 103 of the lens unit 102 each are retained so that the plane containing the outer periphery of the reflecting surface thereof is substantially vertical to the bottom plane of the apparatus body 101. Further, the imaging device 108 is attached so that its imaging surface is inclined toward the vertical direction with respect to the bottom plane of the apparatus body 101 instead of toward parallel thereto, i.e., inclined at an inclination of more than 45 degrees with respect to the bottom plane.

A general operation of the optical system of thus constructed third embodiment will now be described. An axial incident light ray 135 incident on the transparent plate 101b of the imaging apparatus body 101 is transmitted through the transparent plate 103b of the lens unit 102 and is incident on a front side upper lens surface of the free curved surface prism 104, and the transmitted light thereof passes through a rear side upper lens surface and is reflected on the first variable configuration mirror 105. The reflected light thereof is incident on the rear side upper lens surface again and the transmitted light thereof passes through a front side lower lens surface and is reflected on the second variable configuration mirror 106. The reflected light thereof is incident on the front side lower lens surface again, and the transmitted light thereof passes through a rear side lower lens surface and is incident on the imaging device 108 having an optical filter so as to be photoelectrically converted. The image pickup signals photoelectrically converted at the imaging device 108 are processed such as at an imaging circuit and image processing circuit so as to be displayed on the image display apparatus 122 and be recorded on the recording media 127.

In such image taking operation, the degree of curvature of the reflecting mirror is changed by adjustment of applied voltage to the variable configuration mirror 105 to effect focusing on the imaging device 108. Further, it is possible to effect zoom adjustment by controlling applied voltage to the first and second variable configuration mirrors 105, 106 to control them in opposite direction from each other, i.e., by changing and adjusting the configuration of the reflecting mirror of one variable configuration mirror from a flat plate to concave and the reflecting mirror of the other variable configuration mirror in opposite direction from a concave to flat plate.

In the third embodiment having such construction, the two variable configuration mirrors and the imaging device are disposed in a manner shared by opposite lens surfaces of the free curved surface prism. It is thus possible to construct an optical system having a downsized and efficient layout. Further, focusing and zoom adjustment on the imaging device can be readily executed without causing a driving sound or the like and at less power consumption by adjusting applied voltage to the variable configuration mirrors. Further, since focusing and zooming can be effected without causing sound, it is not necessary to shield the microphone unit from the optical system and they can be disposed closely to each other.

A modification of the third embodiment will now be described by way of FIGS. 8A to 8D. FIG. 8A is a front view showing an interior of the apparatus body of the modification with removing a front side portion thereof; FIG. 8B is a side view showing the interior with removing a side portion of the same apparatus body; FIG. 8C is a sectional top view along line Y–Y' in FIG. 8A; and FIG. 8D is a sectional top view along line X–X' in FIG. 8A. Those identical or corresponding members as in the third embodiment shown in FIGS. 6A to 6C are denoted by like reference numerals and description thereof will be omitted.

The third embodiment of FIGS. 6A to 6C has been shown as that in which the lens unit 102 including lens cover 103, free curved surface prism 104, first and second variable configuration mirrors 105, 106, and imaging device 108 having an optical filter is disposed vertically within the apparatus body 101. In this modification, the lens unit 102 is disposed laterally within the apparatus body 101 so that the dimension of height of the imaging apparatus can be reduced. Other than that, this modification is different from the third embodiment in that an optical finder unit 136 and tripod section 137 are added and that the I/O jack unit is disposed in a manner divided to DC jack 126a and IF jack 126b.

Figure 9B:
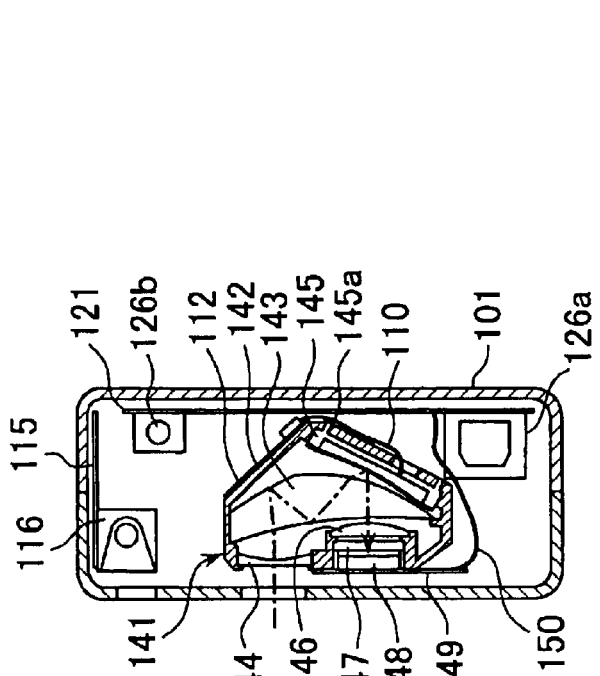
FIGS. 9A to 9D show a fourth embodiment of the invention.
Figure 9A:
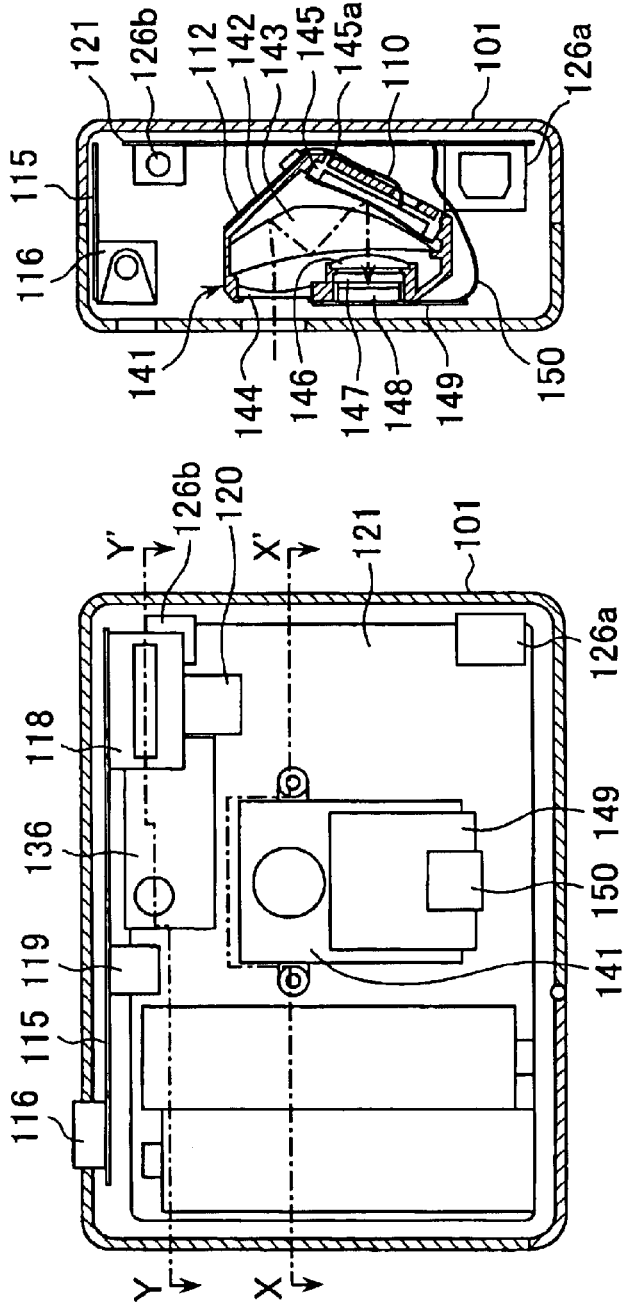
Figure 9D:
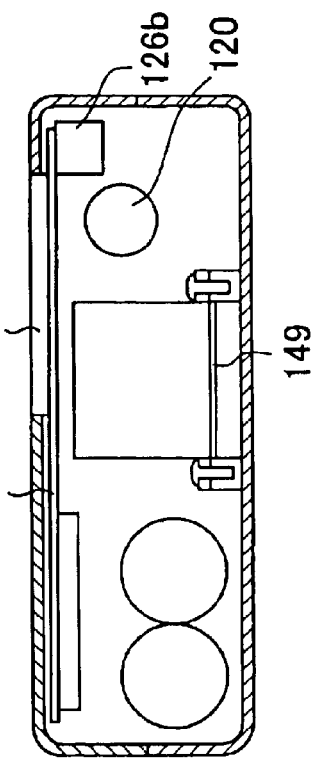
Figure 9C:
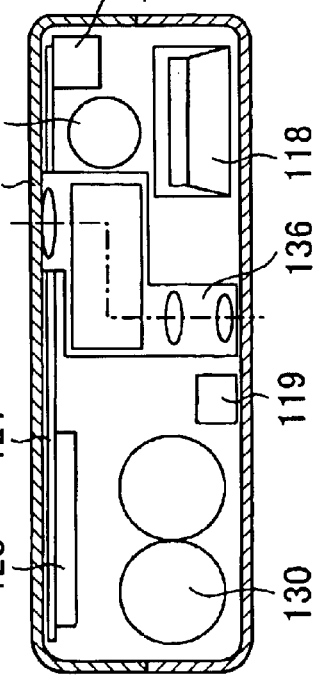

A fourth embodiment of the invention will now be described by way of FIGS. 9A to 9D. FIG. 9A is a front view showing an interior of the apparatus body of the fourth embodiment with removing a front portion thereof; FIG. 9B is a sectional side view; FIG. 9C is a sectional top view along line Y–Y' in FIG. 9A; and FIG. 9D is a sectional top view along line X–X' in FIG. 9A. Those identical or corresponding members as in the third embodiment shown in FIGS. 6A to 6C are denoted by like reference numerals and description thereof will be omitted.

In this embodiment, a lens unit 141 includes: a free curved surface prism 143 disposed at the interior of a lens cover 142; a first lens 144 serving as incident lens disposed in a manner facing and with a separation from a front side upper lens surface of the free curved surface prism 143; a variable configuration mirror 145 disposed in a manner facing and with a separation from a rear side lower lens surface (lower portion of a first optical surface facing toward the rear side of the apparatus body) of the free curved surface prism 143; a second lens 146 disposed in a manner facing and with a separation from a front side lower lens surface (a second optical surface facing toward the front side of the apparatus body) of the free curved surface prism 143; and an imaging device 148 having optical filter 147, disposed in a manner facing and with a separation from the second lens 146 and having a rear surface thereof uncovered by the lens cover 142. It should be noted that the variable configuration mirror 145 is positioned and retained such that boss 145a formed in a manner projecting therefrom is caused engage with a hole formed on the lens cover 142. Further the first and second lenses 144, 146, and the imaging device 148 having optical filter are positioned and retained as engaged, respectively, with stepped portions formed on the lens cover 142. The imaging surface of the imaging device 148 is disposed so as to be substantially vertical to the bottom plane of the apparatus body 101.

A mirror board 112 is disposed on an outside inclined surface of a rear upper portion of the lens cover 142 of the lens unit 141, and an imaging board 149 is disposed on the reverse side of the imaging device 148, i.e., on the lens cover 142 toward the front side of the apparatus body. Of the mirror flexible board 110 connected at one end thereof to the variable configuration mirror 145, one end is connected to the mirror board 112. Further, of an imaging device flexible board 150 connected at one end thereof to the imaging board 149, the other end is connected to the rear side board 121. It should be noted that a bottom side board is omitted in the present embodiment. An imaging circuit, etc., are mounted on the imaging board 149, and, in addition to the image display apparatus 122, CPU, memory, and image processing circuit, those including an I/O jack such as IF jack 126a and DC jack 126b, media connector 128, media I/F circuit, power supply circuit are disposed on the rear side board 121.

A description will now be given with respect to the operation of the lens unit section which is a main part of the fourth embodiment having the construction as the above. An axial incident light ray passed through a first lens 144 of the lens unit 141 and transmitted through a front side upper lens surface of the free curved surface prism 143 is reflected on a rear side upper lens surface of the free curved surface prism 143. The reflected light thereof is further reflected on a front side center lens surface of the free curved surface prism 143 and is transmitted through a rear side lower lens surface to reach the variable configuration mirror 145. The incident light reached the variable configuration mirror 145 is reflected on the mirror surface of the variable configuration mirror 145 and is incident on the rear side lower lens surface of the free curved surface prism 143 again. It is transmitted through the lens surface and further transmitted through a front side lower lens surface of the free curved surface prism 143. The incoming light is then incident on the imaging device 148 through the second lens 146 and optical filter 147 to be photoelectrically converted.

At this time, the degree of curvature of the mirror surface of the variable configuration mirror 145 is changed by controlling applied voltage to the variable configuration mirror 145 so as to effect focusing on the imaging device 148. It should be noted that zoom adjustment cannot be effected in this embodiment, since a single variable configuration mirror is used. A further downsizing of lens unit, however, can be achieved, since the lens unit is constructed by combining the single variable configuration mirror and two lenses into a free curved surface prism.

A modification of the fourth embodiment will now be described by way of FIGS. 10A to 10D. FIG. 10A is a front view showing an interior of the apparatus body of the modification with removing a front side portion thereof; FIG. 10B is a side view showing the interior with removing a side portion of the same apparatus body; FIG. 10C is a sectional top view along line Y–Y' in FIG. 10A; and FIG. 10D is a sectional top view along line X–X' in FIG. 10A. Those identical or corresponding members as in the fourth embodiment shown in FIGS. 9A to 9D are denoted by like reference numerals and description thereof will be omitted.

The fourth embodiment of FIGS. 9A to 9D has been shown as that in which the lens unit 141 including lens cover 142, free curved surface prism 143, first and second lenses 144, 146, variable configuration mirror 145, and imaging device 148 having an optical filter is disposed vertically within the apparatus body 101. In this modification, the lens unit 141 is disposed laterally within the apparatus body 101 so that the dimension of height of the imaging apparatus can be reduced. Other than that, this modification is different from the fourth embodiment only in that the position of placement of the microphone unit 119 is changed and the configuration of an internal prism of the optical finder unit 136 is changed.

Figure 11B:
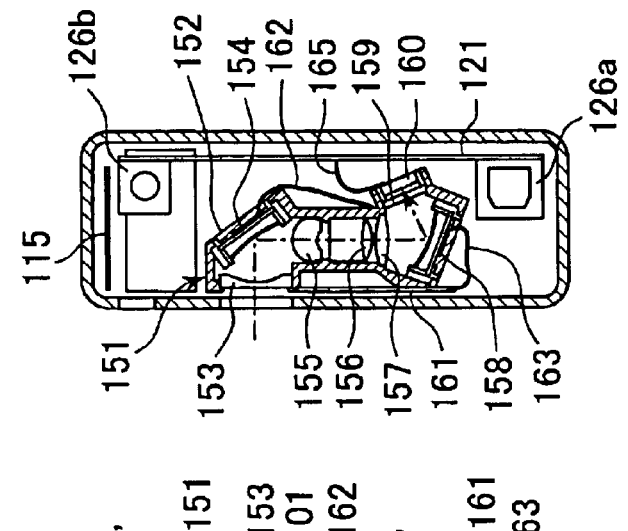
FIGS. 11A to 11D show a fifth embodiment of the invention.
Figure 11A:
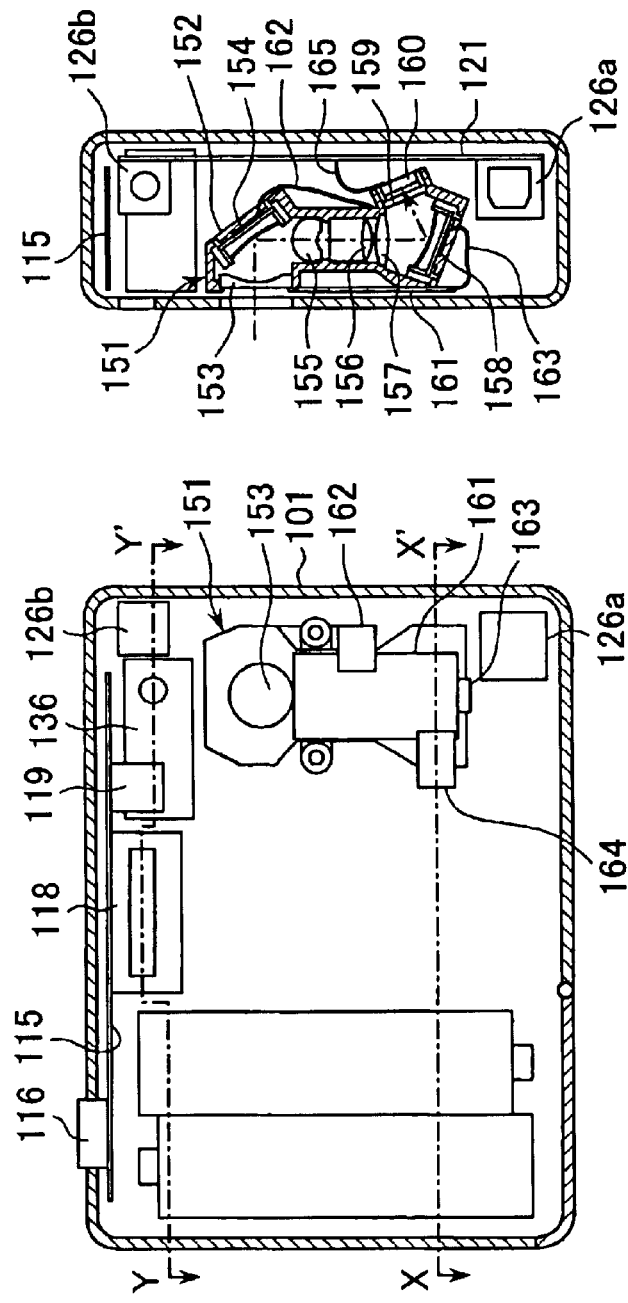
Figure 11D:
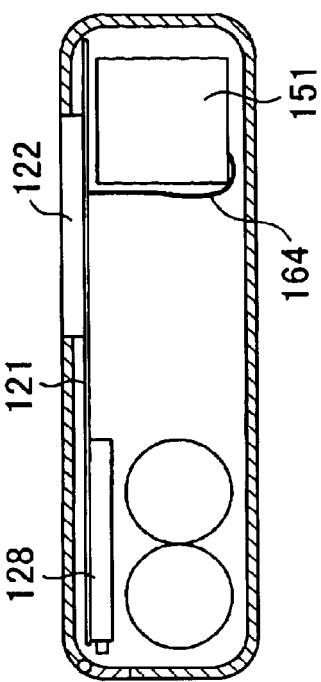
Figure 11C:
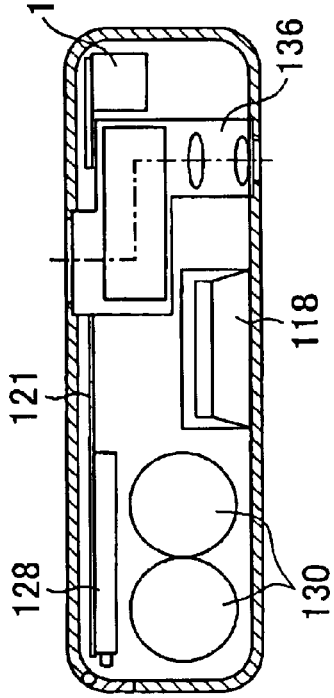

A fifth embodiment of the invention will now be described by way of FIGS. 11A to 1D. FIG. 11A is a front view showing an interior of the apparatus body of the fifth embodiment with removing a front portion thereof; FIG. 11B is a sectional side view; FIG. 11C is a sectional top view along line Y–Y' in FIG. 11A; and FIG. 11D is a sectional top view along line X–X' in FIG. 11A. Those identical or corresponding members as in the third embodiment shown in FIGS. 6A to 6C are denoted by like reference numerals and description thereof will be omitted.

Figure 12:
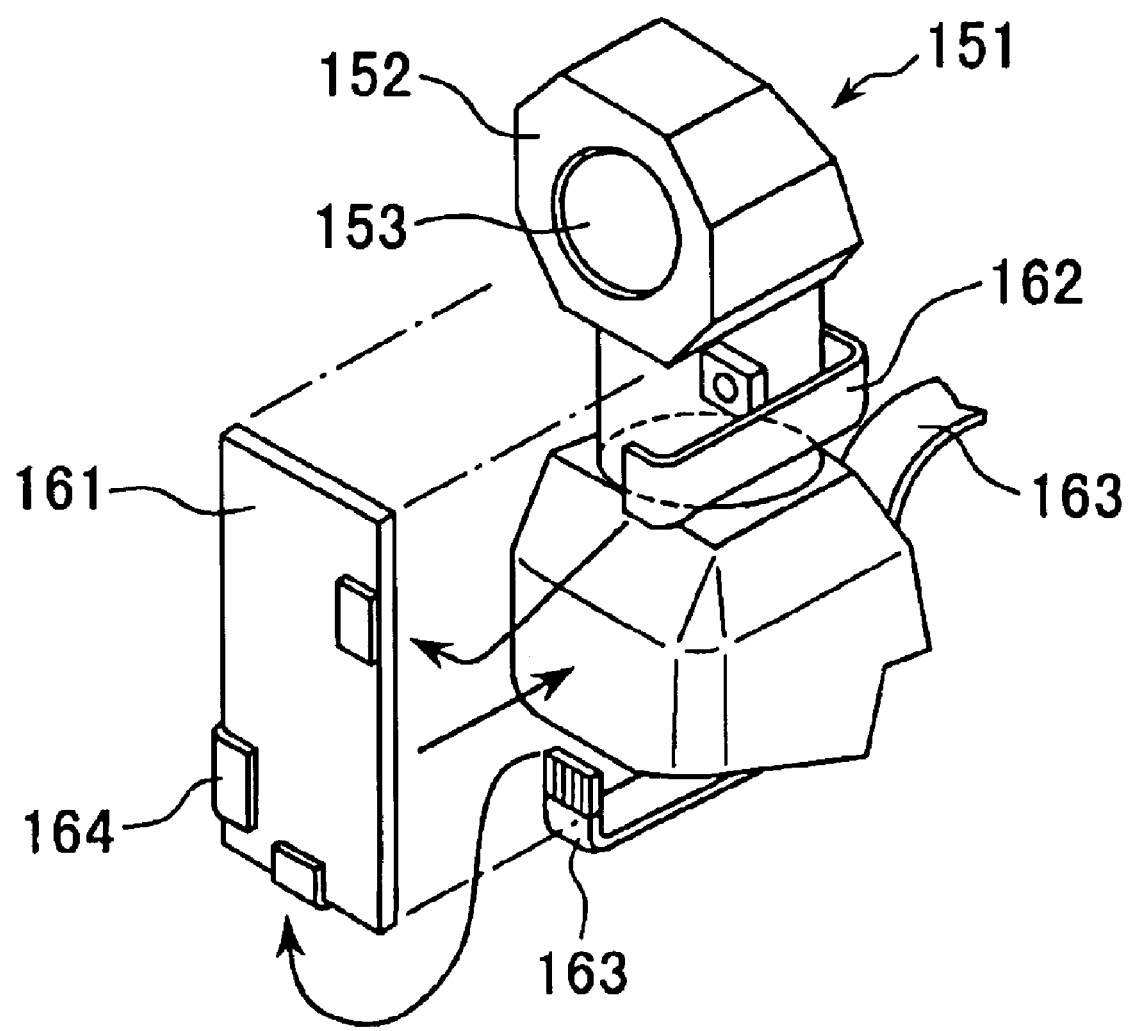
FIG. 12 is an disassembled, enlarged perspective view of the lens unit portion in the fifth embodiment shown in FIGS. 11A to 11D.

In this embodiment, a combined lens group consisting of a plurality of ordinary lenses is used as an optical system instead of a free curved surface prism. In particular, a lens unit 151 according to this embodiment is provided with a lens cover 152 of the form as shown in FIG. 12. A first lens 153 is disposed at a front side entrance opening of the lens cover 152, and a first variable configuration mirror 154 is disposed in an inclined manner on a rear side upper portion of the lens cover 152 so as to face the first lens 153. A combined lens group consisting of three lenses, i.e., a second, third, and fourth lenses 155, 156, 157 is disposed within the center barrel of the lens cover 152. The lens unit 151 is constructed such that a second variable configuration mirror 158 is disposed at a bottom portion of the lens cover 152 and in addition an imaging device 160 having optical filter 159 provided in front thereof is disposed at a rear side lower portion of the lens cover 152.

A mirror board 161 having for example a mirror drive circuit and temperature compensating sensor mounted thereon is attached to an outer front side of the lens cover 152 of the lens unit 151. A first mirror flexible board 162 connected at one end thereof to the first variable configuration mirror 154 and a second mirror flexible board 163 connected at one end thereof to the second variable configuration mirror 158 are respectively connected at the other end thereof to the mirror board 161.

The rest of the construction of this embodiment is similar to the third or fourth embodiment. In particular, a release button 116, strobe unit 118, microphone unit 119 are provided on the top side board 115 and such as a microphone circuit and strobe circuit are mounted thereon; and an image display apparatus 122, IF jack 126a, DC jack 126b, media connector 28 are provided on the rear side board 121 and such as CPU, memory, imaging circuit, image processing circuit, media I/F circuit, power supply circuit are mounted thereon.

It should be noted that, in FIGS. 11A to 11D and FIG. 12, numeral 164 denotes a mirror board connecting flexible board connected between the mirror board 161 and the rear side board 121, and 165 denotes an imaging device flexible board connected between the imaging device 160 and the rear side board 121. Further, numeral 130 denotes a battery and 136 denotes a finder unit.

A description will now be given with respect to the operation of the lens unit section which is a main part of the fifth embodiment having the construction as the above. An axial incident light ray incident on the first variable configuration mirror 154 through the first lens 153 of the lens unit 151 is reflected substantially vertically on the mirror surface of the first variable configuration mirror 154. The reflected light thereof is then passed through the combined lens group disposed at a center portion of the lens cover 152 to be incident on the second variable configuration mirror 158. The reflected light incident on the second variable configuration mirror 158 is reflected on the mirror surface again and is incident on the imaging device 160 through the optical filter 159 so as to be photoelectrically converted.

At this time, while main focusing is effected by adjustment of applied voltage to the first variable configuration mirror 154, a focusing with less aberration can be obtained by in addition driving the second variable configuration mirror 158. Further, zoom adjustment is effected by adjustment of the first and second variable configuration mirrors 154, 158. It should be noted that, in this embodiment, the lens unit can be readily manufactured, since a combined lens group consisting of a plurality of ordinary lenses is used instead of the free curved surface prism.

Figure 13B:
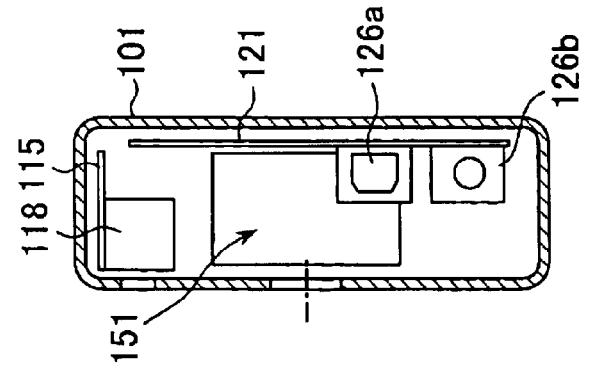
FIGS. 13A to 13D show a modification of the fifth embodiment shown in FIGS. 11A to 11D.
Figure 13A:
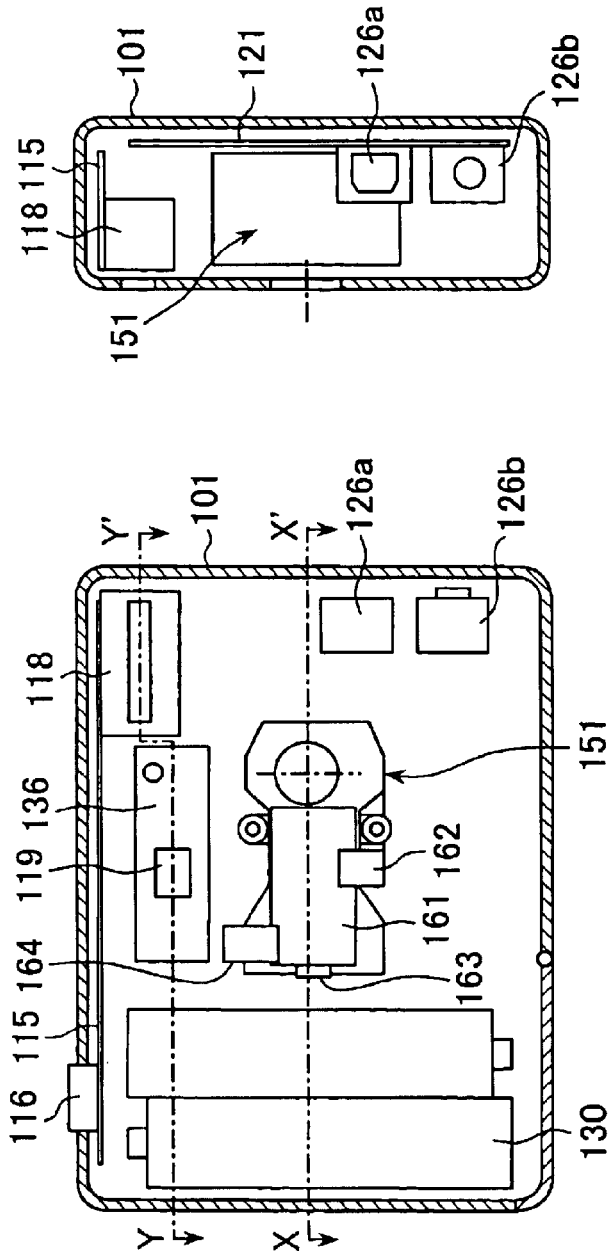
Figure 13D:
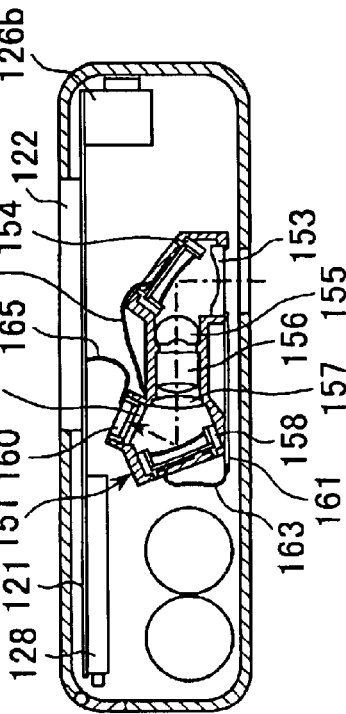
Figure 13C:
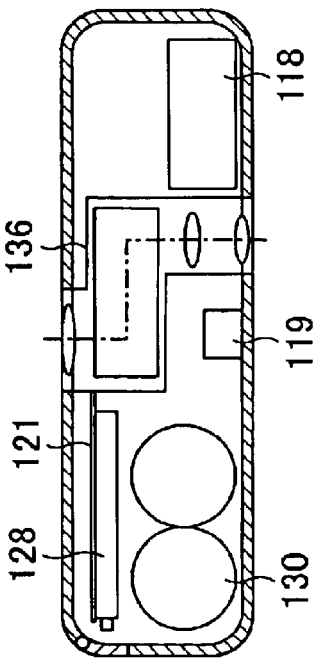

A modification of the fifth embodiment will now be described by way of FIGS. 13A to 13D. FIG. 13A is a front view showing an interior of the apparatus body of the modification with removing a front side portion thereof; FIG. 13B is a side view showing the interior with removing a side portion of the apparatus body; FIG. 13C is a sectional top view along line Y–Y' in FIG. 13A; and FIG. 13D is a sectional top view along line X–X' in FIG. 13A. Those identical or corresponding members as in the fifth embodiment shown in FIGS. 11A to 11D are denoted by like reference numerals and description thereof will be omitted.

The fifth embodiment of FIGS. 11A to 11D has been shown as that in which the lens unit 151 including lens cover 152, first lens 153, first and second variable configuration mirrors 154, 158, the combined lens group consisting of three lenses 155, 156, 157, and imaging device 160 having an optical filter is disposed vertically within the apparatus body 101. In this modification, the lens unit 151 is disposed laterally within the apparatus body 101 so that the dimension of height of the imaging apparatus can be reduced. Other than that, this modification is different from the fifth embodiment only in that the strobe unit 118, microphone unit 119, optical finder unit 136, IF jack 126a, DC jack 126b, etc., are changed in their position of placement as a result of the lateral disposition of the lens unit 151.

Figure 14A:
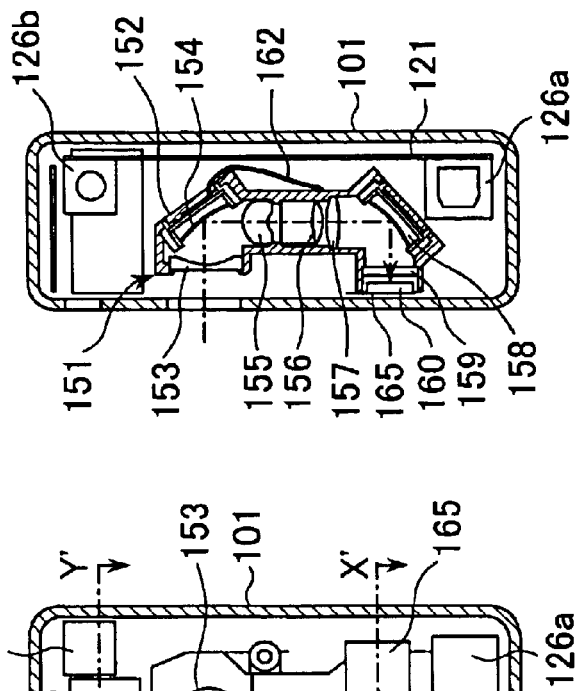
FIGS. 14A to 14D show a sixth embodiment of the invention.
Figure 14B:
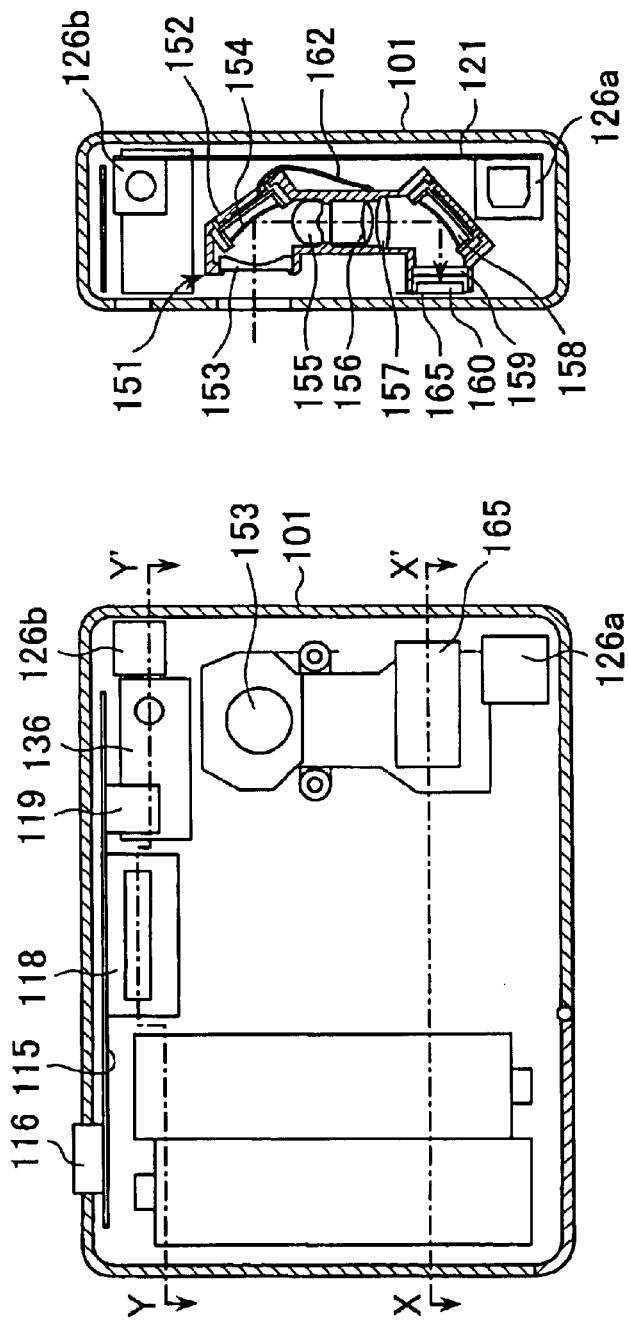
Figure 14D:
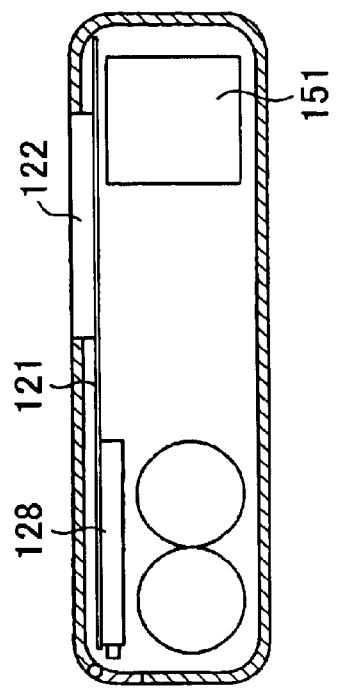
Figure 14C:
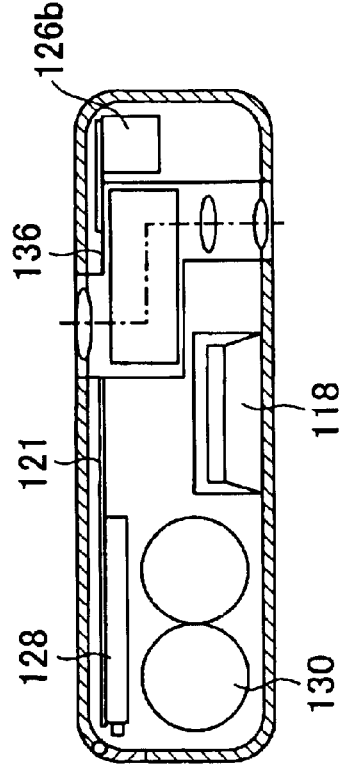

A sixth embodiment of the invention will now be described by way of FIGS. 14A to 14D. FIG. 14A is a front view showing an interior of the apparatus body of the sixth embodiment with removing a front portion thereof; FIG. 14B is a sectional side view; FIG. 14C is a sectional top view along line Y–Y' in FIG. 14A; and FIG. 14D is a sectional top view along line X–X' in FIG. 14A. Those identical or corresponding members as in the fifth embodiment shown in FIGS. 11A to 11D are denoted by like reference numerals and description thereof will be omitted.

In this embodiment, the imaging device 160 of the lens unit 151 is disposed at a lower portion on the front side (entrance side) of the lens cover 152 so that it is substantially vertical to the bottom plane of the apparatus body 101. In thus constructed lens unit 151, an axial incident light ray transmitted through the first lens 153 and reflected on the first variable configuration mirror 154 passes through the combined lens group 155, 156, 157, is reflected again on the second variable configuration mirror 158, and is incident on the imaging device 159 to be photoelectrically converted.

In this embodiment, too, main focusing is effected by the first variable configuration mirror 154, and a focusing with less aberration can be effected by in addition driving the second variable configuration mirror 158. Further, zoom adjustment can be effected by concurrently driving the first and second variable configuration mirrors 154, 158.

Figure 15:
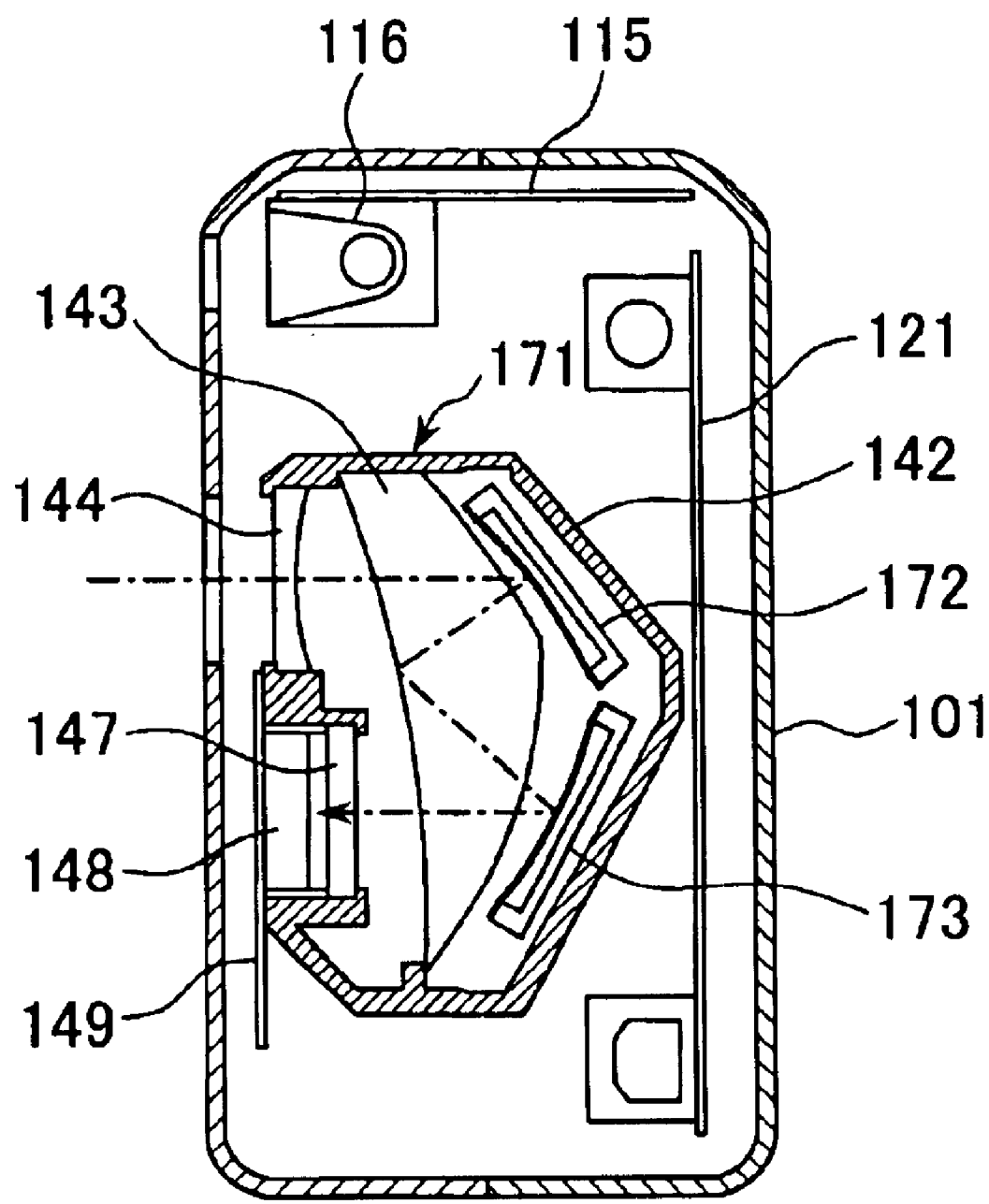
FIG. 15 shows a seventh embodiment of the invention.

A seventh embodiment of the invention will now be described by way of a schematic sectional side view shown in FIG. 15. This embodiment is developed from the construction of the fourth embodiment shown in FIGS. 9A to 9D. In particular, two variable configuration mirrors are used by providing additional one so that zoom adjustment can be effected in the construction where the imaging surface of the imaging device is disposed substantially vertical to the bottom plane of the apparatus body. In FIG. 15, those identical or corresponding members as in the fourth embodiment shown in FIG. 9 are denoted by like reference numerals and description thereof will be omitted.

In this embodiment, a first variable configuration mirror 172 is disposed in a manner facing and with a separation from a rear side upper lens (upper portion of the first optical surface facing toward the rear side of the apparatus body) of a free curved surface prism 143, and a second variable configuration mirror 173 is disposed in a manner facing and a separation from a rear side lower lens also of the free curved surface prism 143. The rest of the construction of the lens unit 171 is substantially similar to the fourth embodiment shown in FIGS. 9A to 9D. The positioning and retaining of the free curved surface prism 143, first and second variable configuration mirrors 172, 173, imaging device 148, etc., (partly not shown) on the lens cover 142 are also similar to the fourth embodiment shown in FIGS. 9A to 9D.

In thus constructed seventh embodiment, an axial incident light ray passing through the first lens 144 of the lens unit 171 and transmitted through the front side upper lens surface of the free curved surface prism 143 passes through a rear side upper lens surface of the free curved surface prism 143 so as to be incident on and reflected by the first variable configuration mirror 172. The reflected light thereof is transmitted through the rear side upper surface again, is reflected on a front side center lens surface of the free curved surface prism 143, and passes through a rear side lower lens surface to be incident on and reflected by the second variable configuration mirror 173. The reflected light thereof passes through the rear side lower lens surface again and then is incident on the imaging device 148 through optical filter 147 so as to be photoelectrically converted.

At this time, focusing is effected by adjustment of applied voltage to the first variable configuration mirror 172 or to the first and second variable configuration mirrors 172, 173, and zoom adjustment can be effected by a concurrent adjustment of the first and second variable configuration mirrors 172, 173. In this embodiment, too, the dimension of height of the imaging apparatus can be reduced by placing the lens unit 171 laterally within the apparatus body 101.

It should be noted that, while one to be driven by electrostatic force has been shown as the variable configuration mirror in the above third to seventh embodiments, those which can be used as the variable configuration mirror, in addition to the one driven by electrostatic force, include one to be driven by electromagnetic force produced by a magnet and a current passed through the reflecting deforming surface (this type being capable also of changing the reflecting deforming surface into a convex) to be described later in detail, and one to be deformed by piezoelectric effect by using a piezoelectric material for the deforming reflecting surface.

Further, while the above third to seventh embodiments have been described as those in which the optical system according to the invention is applied to a digital camera as the imaging apparatus, the optical system for imaging shown in the third to seventh embodiments can be applied not only to such but also to a video camera, mobile phone having a built-in camera, PDA, etc.

Figure 16:
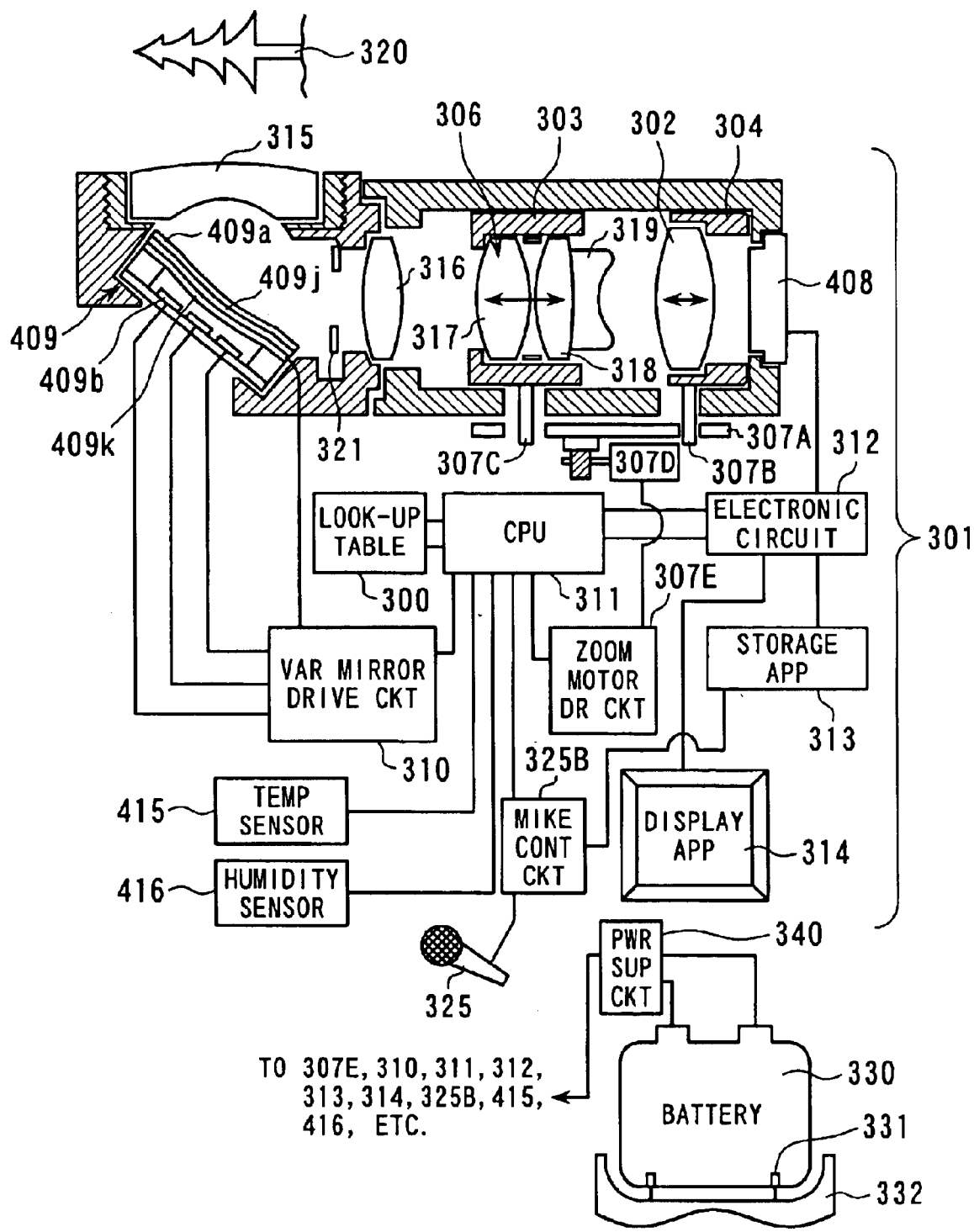
FIG. 16 is a block diagram showing an eighth embodiment of the invention.

An eighth embodiment of the invention will now be described. In this embodiment, too, the optical apparatus according to the invention is applied to the imaging optical system of an electronic imaging apparatus such as digital camera. An electronic imaging apparatus 301 shown in FIG. 16 is provided with an example of such optical apparatus, the optical apparatus including a variable configuration mirror 409 capable of focusing by changing the configuration of a reflecting surface thereof by electric control. Such an imaging optical system can be used for example in TV camera, camcoder, monitoring camera, robot's eye. In any of these apparatus, use of battery as the power supply is demanded.

A mirror body of the variable configuration mirror 409 to be used in this embodiment is formed of three layers for example of a thin board 409j such as one made of polyimide, a thin reflecting film 409a formed for example of aluminum coating on one surface thereof, and an electrode 409k thinly formed on the other surface thereof. By applying different voltages from a variable mirror drive circuit 310 to a plurality of fixed electrodes 409b disposed on a surface region facing the electrode 409k, the reflecting surface is changed by electrostatic force into a configuration corresponding to the condition of distribution of such applied voltages so that the configuration of the reflecting surface can be changed.

A concave lens 315 directed toward an object 320 to be photographed, a convex lens 316, and an iris 321 are attached to a frame body on which the variable configuration mirror 409 is mounted. Further, two movable plastic lens frames 303, 304 are disposed on a frame body on which a solid-state imaging device 408 is mounted, and a variable power lens 306 and plastic lens 302 are respectively mounted on these frames. The variable power lens 306 is constituted by a convex lens 317, aspheric convex lens 318, and a concave lens 319.

The zooming mechanism includes: a cam pin 307C provided on the plastic lens frame 303; a cam pin 307B provided on the plastic lens frame 304: a cam plate 307A having cam groove formed thereon for inserting the cam pins 307B, 307C; a zoom motor 307D for rotating the cam plate 307A; and a zoom motor drive circuit 307E. A variable power photographing is effected by movement of the variable power lens 306, and focusing shift is compensated by movement of the plastic lens 302. It should be noted that a stepping motor is used as the zoom motor 307D.

The electronic imaging apparatus 301 is provided with an autofocus function of contrast method by the variable configuration mirror 409, and the variable configuration mirror 409 is driven as follows. A microcomputer 311, while referring to a look-up table 300, causes the reflecting film 409a to be changed into different shapes and previously takes several images by applying different voltages to the fixed electrodes 409b of the variable configuration mirror 409 through the variable mirror drive circuit 310. The microcomputer 311 then fetches high-frequency components from the plurality of image information inputted from the solid-state imaging device 408 through the electronic circuit 312. The drive voltage of the variable configuration mirror at which the high-frequency components are maximum is then computed by reference to the look-up table 300 or by an interpolation or extrapolation of numerical values on the look-up table 300. A main image taking is then effected by applying such computed drive voltage to the variable configuration mirror 409 through the variable mirror drive circuit 310. It should be noted that a temperature sensor 415 and humidity sensor 416 are connected to the microcomputer 311.

An example of the look-up table 300 to be referred to at this time is shown in FIG. 17. As shown, the look-up table 300 represents object distance along one of the vertical and horizontal axes and zoom conditions along the other and possesses as data the respectively corresponding voltages to be applied to the electrodes 1, 2, 3 of the fixed electrodes 409b. Further, the zoom condition is detected for example by the number of pulses delivered to the zoom motor 307D, and it suffices to change each voltage to be applied to the electrodes 1, 2, 3 of the fixed electrodes 409b of the variable configuration mirror 409 according to the numerical value of object distance corresponding to each zoom condition. It is also possible to detect the zoom condition by an encoder for detecting the position of the variable power lens 306.

The image taken at the solid-state imaging device 408 in this manner is processed at the electronic circuit 312 and stored to a storage apparatus 313. It can also be displayed on the display apparatus 314. An ordinary liquid crystal display, a liquid crystal display serving as both reflecting and transmitting types, a reflecting type liquid crystal display or an organic EL display for example is preferably used as the display device 314 because of smaller power consumption, though it is possible to use a CRT display.

In the present embodiment having such construction, the power spent at the variable configuration mirror 409 and the variable mirror drive circuit 310 is small to be only one of several to several-ten parts (several-ten mW to 200 mW) as compared to the case of driving an ordinary focusing lens by a motor (0.3 to 5W). Accordingly, it becomes possible to effect autofocus control by the variable configuration mirror 409 even when a zoom motor is driven (0.3 to 5W of power being spent at the zoom motor 307D, zoom motor drive circuit 307E) so that dynamic images always in focus can be taken even during zooming at the time of taking dynamic images by an electronic imaging apparatus such as a video camera or digital camera.

Such a merit is obtained not only in the case of a video camera or digital camera but also in the case where the imaging optical system shown in FIG. 16 is used for example in TV camera or motion-picture film camera. Provided that the solid-state image pickup device 408 in FIG. 16 is replaced by film if applied to the motion-picture film camera.

Figure 18A:
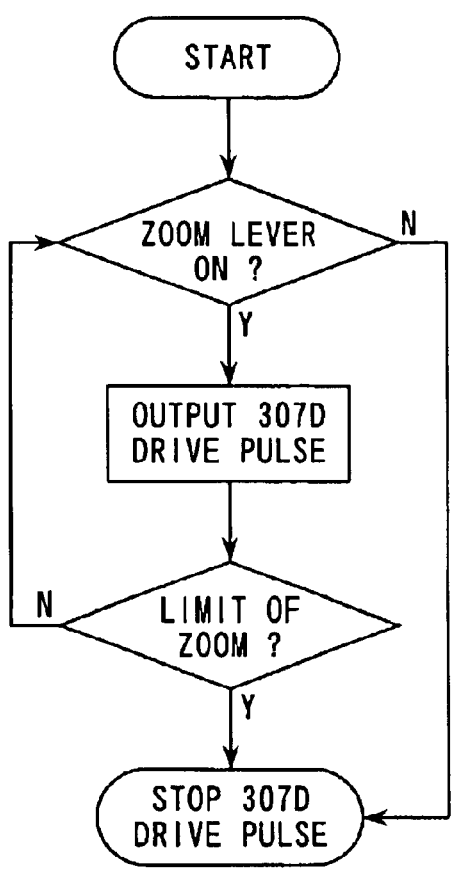
FIGS. 18A and 18B are flowcharts for explaining operation of zoom control and autofocus control in the eighth embodiment shown in FIG. 16.
Figure 18B:
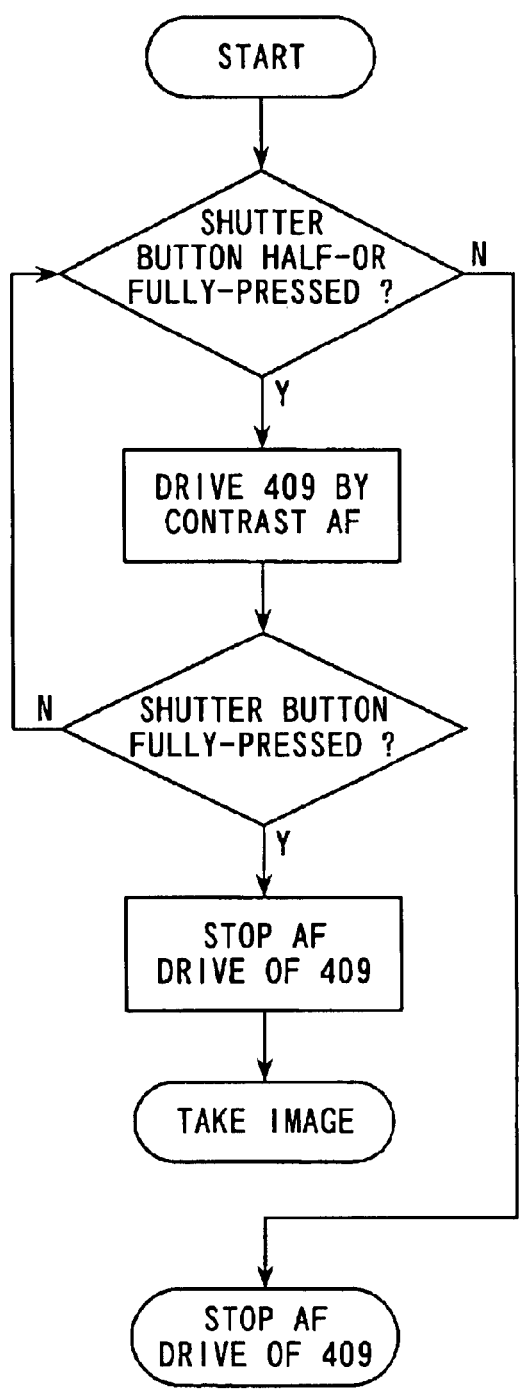

A flowchart regarding the zoom control in the present embodiment is shown in FIG. 18A, and a flowchart regarding autofocus (AF) control is shown in FIG. 18B. It should be noted that, when the shutter button is half-pressed in the flowchart of autofocus control shown in FIG. 18B, an image is not taken but AF operation is effected. On the other hand, when the shutter button is fully pressed, both image taking and AF operation are effected.

Further, the present embodiment is not limited to the taking of dynamic images, and it is also possible in taking a static image to obtain an image in focus without a time lag of autofocus by effecting zooming during autofocus and by pressing the shutter when a favorable framing of picture has been achieved.

Generally in a digital camera or the like, a mode switching of the optical system is effected in taking an image correspondingly to the distance to the object. With the electronic imaging apparatus 301 shown in FIG. 16, it is possible to make unnecessary such mode switching of the optical system. When autofocus of the contrast method using a motor as the drive source is effected as in the conventional case, performance of rapid autofocus for all distances cannot be effected due to the fact that the moving amount of lens is large. The object distances are thus divided for example into two regions, i.e., one from infinity to 70 cm (standard) and the other from 70 cm to 20 cm (macro) so that the user, after judging at which one of the distances the object is located, selects a mode of autofocus in taking an image. By contrast, use of the variable configuration mirror 409 as in the present embodiment makes it possible to effect autofocus for all object distances, since the configuration changing rate of the mirror body consisting of three-layer deforming film is rapid to the extent of several ms or less. Accordingly, the switching to a macro mode by the user becomes unnecessary.

Figure 19:
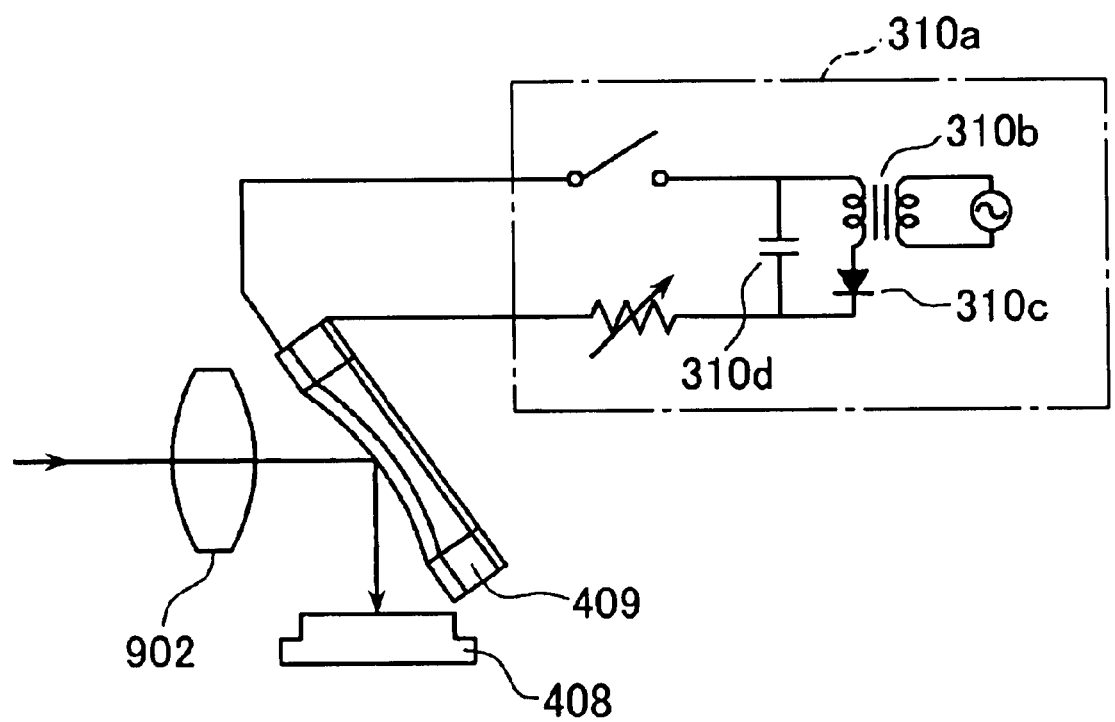
FIG. 19 shows an example of construction of power supply of the drive circuit of the variable configuration mirror in the eighth embodiment shown in FIG. 16.

The variable mirror drive circuit 310 preferably contains a step-up circuit 310a having a step-up transformer 310b using a coil as shown in FIG. 19. Use of a laminated piezoelectric transformer makes downsizing possible and is especially preferable. Such step-up circuit is useful for the variable configuration mirror or variable focal lens especially when electrostatic force or piezoelectric effect is used. In FIG. 19, numeral 310c denotes a rectifying diode and 310d denotes a smoothing capacitor.

Figure 20:
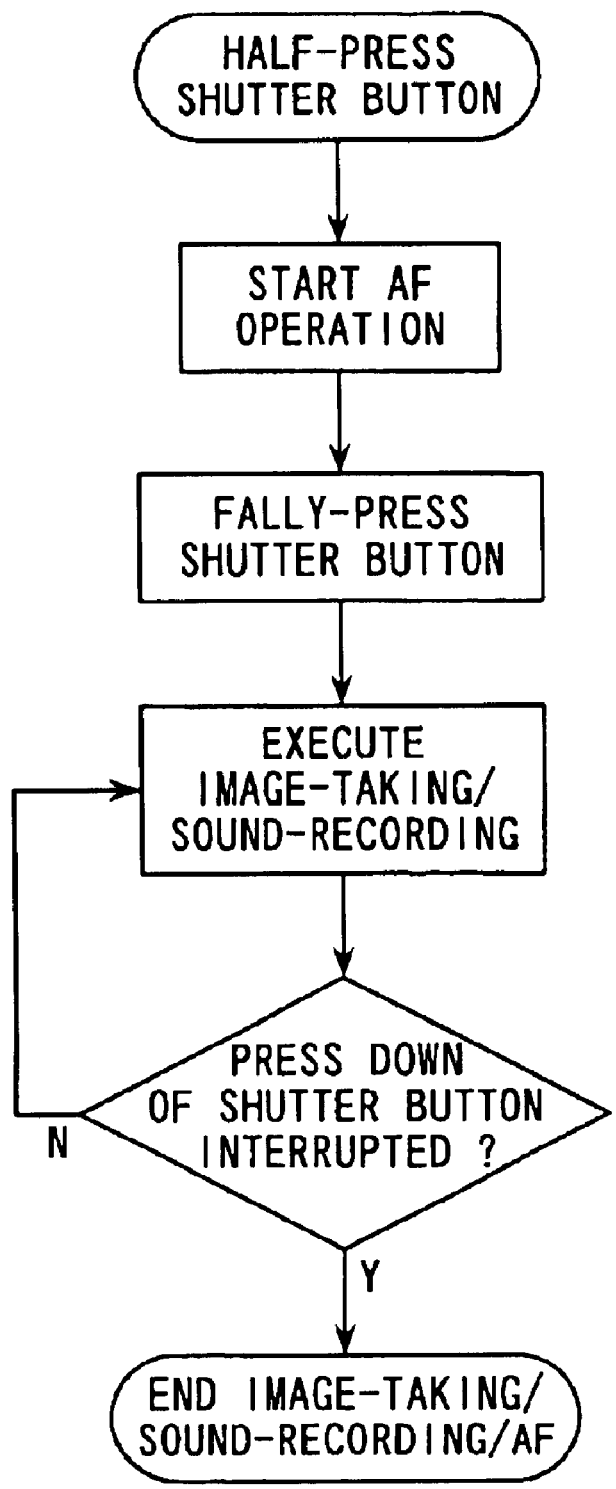
FIG. 20 is a flowchart for explaining operation in taking dynamic images in the eighth embodiment shown in FIG. 16.

Further, the electronic imaging apparatus of the present embodiment shown in FIG. 16 includes a microphone 325 for recording required sound and a microphone control circuit 325B. By using such construction, sounds can be collected and recorded to the storage apparatus 313 during the taking of dynamic images or static image. Specifically, in the case where a focusing lens is driven by a motor as in the conventional example, it has been impossible to record a sound while effecting autofocus because of the produced "zuruzuru" noise or "jee" noise. In the case of the present embodiment, by contrast, a sound recording while performing autofocus becomes possible, since a noise is not produced in the focusing operation of the variable configuration mirror 409. A flowchart in the case of taking dynamic images while collecting sounds is shown in FIG. 20.

When the display apparatus 314 is on in the above embodiment, an image taken at the solid-state imaging device 408 is being displayed on the display apparatus 314. For this reason, it is possible to continuously display dynamic images even when an image is not being taken for example as a finder at the time of taking a static image. If the display apparatus 314 is used in this manner, however, it has conventionally been impossible to always effect autofocus. This is because the power consumption of the motor for autofocus is high and the dissipation of the battery is severe.

Figure 21:
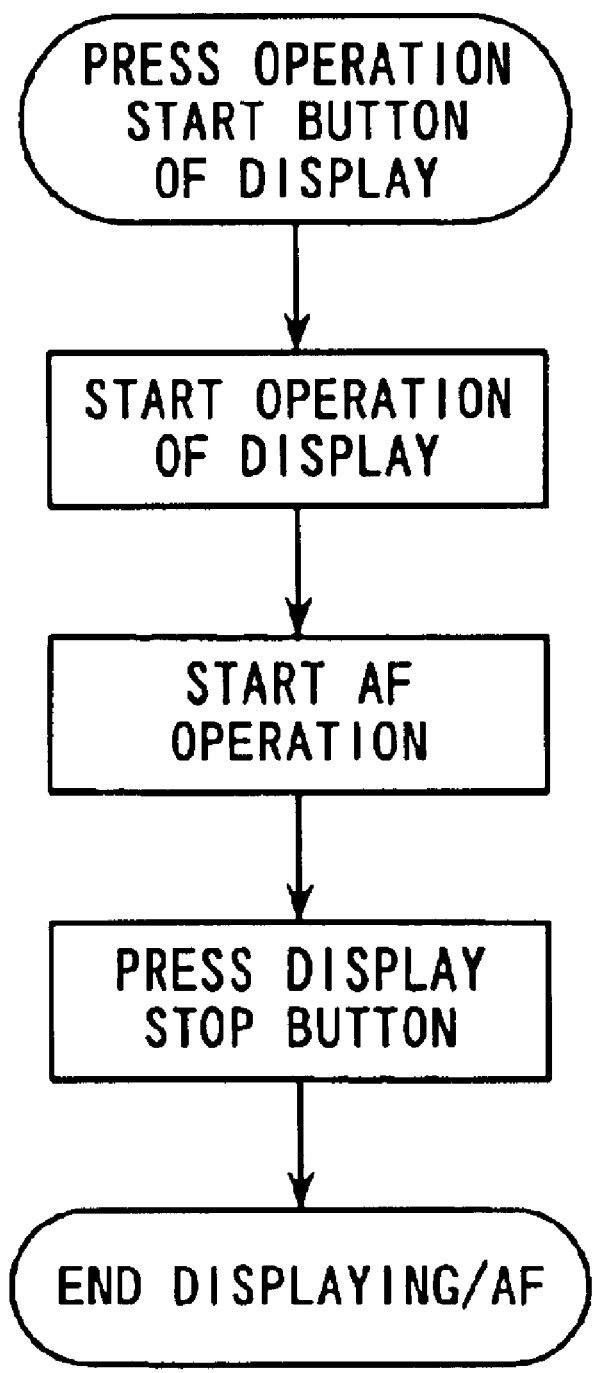
FIG. 21 is a flowchart showing the manner in operation of the display apparatus in the eighth embodiment shown in FIG. 16.

In the case of the electronic imaging apparatus 301 according to the present embodiment shown in FIG. 16, however, it is possible to always effect autofocus even when the display apparatus 314 is being used, since the power consumption of the variable configuration mirror 409 is small. For this reason, images in focus are always displayed on the display apparatus 314 even when the object distance in a field is changed. Further, while some electronic imaging apparatus are provided with an optical finder, the provision of such optical finder becomes unnecessary due to the fact that images in focus are always displayed on the display apparatus 314. Thus there is also a merit that the imaging apparatus becomes reduced in size and weight. A flowchart for explaining the operation in the case of construction for causing AF operation to be effected during the operation of the display apparatus is shown in FIG. 21.

To further reduce power consumption, instead of always effecting autofocus operation when using the display apparatus 314, it suffices to apply voltage to the variable configuration mirror 409 so that a far distance (for example more than 70 cm or 1 m) is always focused. It is thereby convenient that images without a blurred portion can be displayed on the display apparatus 314 in most of the using conditions. Further, it is also possible to turn off the voltage to be applied on the variable configuration mirror 409. In that case, since the imaging system becomes focused on infinity or a near-infinite distance, images with less blurred portions are displayed on the display apparatus 314 in most of the using conditions and are practically acceptable. Also to reduce power consumption, it is desirable not to cause a turning on electricity to the variable configuration mirror when the display apparatus is turned off and autofocus is not being effected.

Further, since, as previously described, power consumption can be reduced by using the variable configuration mirror 409, there is a merit that it is not necessary to carry a spare battery. In the case of the present embodiment, thus, a charging type battery 330 is used as the power supply for the power supply circuit 340 as shown in FIG. 16. The battery 330 is embedded within the body of the electronic imaging apparatus 301, and only a contact 331 is brought out to an external surface so that it is used as charged at any time by a charging unit 332. By such construction, mechanical members for the replacing of the battery (lid, case, etc., of the battery) become unnecessary so that a reduction of size and weight of the electronic imaging apparatus 301 is possible. Instead of providing the contact 331 on the body outer surface, it is also possible that the battery 330 be charged by an electromagnetic induction system without contacting the charging unit. The contact 331 then becomes unnecessary and a more suitable construction is achieved. Further, when the charging type battery is integrally disposed within the apparatus body, it can be disposed so that the user cannot exchange the charging type battery.

In the above embodiments, the variable optical characteristic optical device has been described as that using a variable configuration mirror which is one of the variable surface configuration optical devices (mirror, lens, prism or the like having a variable surface configuration). The variable optical characteristic optical device however is not limited to such.

Figure 22:
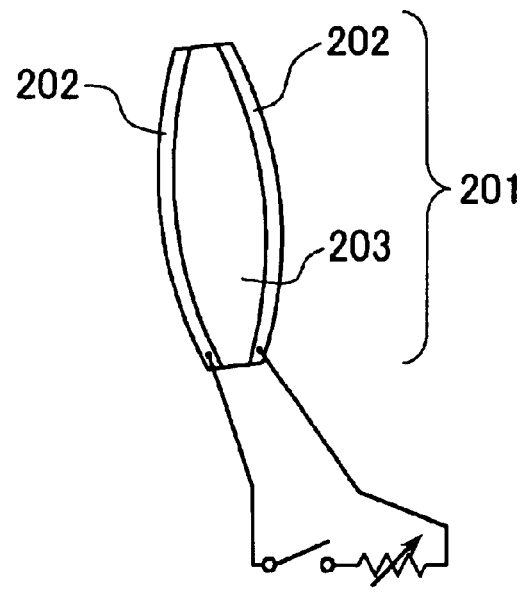
FIG. 22 schematically shows construction of a variable focal lens.
Figure 23:
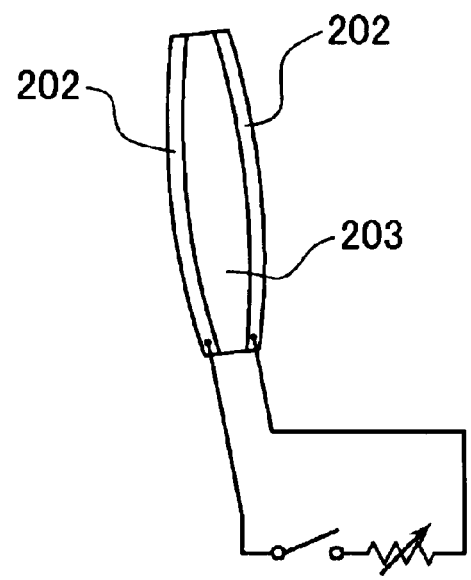
FIG. 23 shows the manner when application voltage on the variable focal lens shown in FIG. 22 is increased.

A variable focal lens will now be described as another variable optical characteristic optical device. FIG. 22 schematically shows the variable focal lens. The variable focal lens 201 is constructed for example by using an electrostrictive material 203 such as silicone rubber or acrylic elastomer which is inserted between two transparent electrodes 202. In thus constructed variable focal lens 201, when the applied voltage to the transparent electrodes 202 is low, it serves as a convex lens as shown in FIG. 22. When the applied voltage is increased, the electrostrictive material 203 is stretched in an up and down direction and contracts in a left and right direction as shown in FIG. 23 so that the focal distance thereof is made longer. Accordingly, it operates as a variable focal lens. By the variable focal lens having such construction, there is a merit that a large-capacity power supply is not required and a small power consumption suffices.

Figure 24:
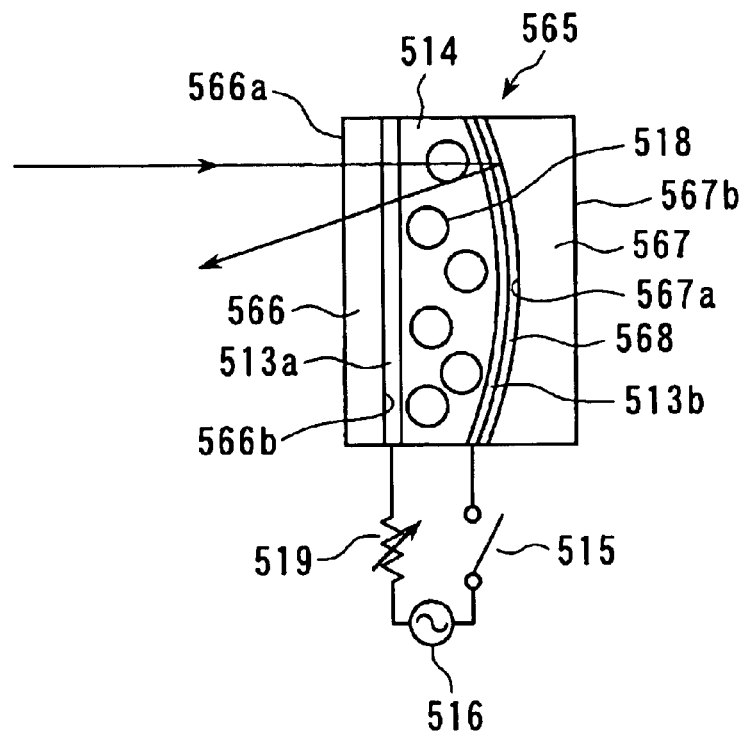
FIG. 24 schematically shows a variable focal mirror using a variable focal lens.

FIG. 24 schematically shows a variable focal mirror using a variable focal lens. The variable focal mirror 565 includes a first transparent board 566 having a first and second surfaces 566a, 566b, and a second transparent board 567 having a third and fourth surfaces 567a, 567b. The first transparent board 566 is formed into a flat plate or lens-like configuration, and a transparent electrode 513a is provided on the inner surface (second surface) 566b thereof. Of the second transparent board 567, the inner surface (third surface) 567a is formed into a concave, and a reflecting film 568 is applied on the concave surface. Further a transparent electrode 513b is provided on the reflecting film 568. A high-molecular dispersed liquid crystal layer 514 is provided between the transparent electrodes 513a and 513b. These transparent electrodes 513a, 513b are connected to AC power supply 516 through a switch 515 and variable resistor 519 so as to apply an AC electric field on the high-molecular dispersed liquid crystal layer 514. It should be noted that, in FIG. 24, numeral 518 denotes a fine high-molecular cell and an illustration of the liquid crystal molecule within the cell is omitted.

With the variable focal mirror having such construction, since a light ray incident on the side of the transparent board 566 passes through an optical path folded within the high-molecular dispersed liquid crystal layer 514 due to the reflecting film 568, it can be treated twice by the effect of the high-molecular dispersed liquid crystal layer 514. At the same time, the focusing position of the reflected light can be changed by changing the applied voltage on the high-molecular dispersed liquid crystal layer 514. It should be noted that the thickness of the high-molecular dispersed liquid crystal layer 514 can be made thinner by forming the inner surface of the transparent board 566 or 567 into a diffraction grating. In this manner, an advantage is obtained that scattering light can be further reduced.

Figure 25:
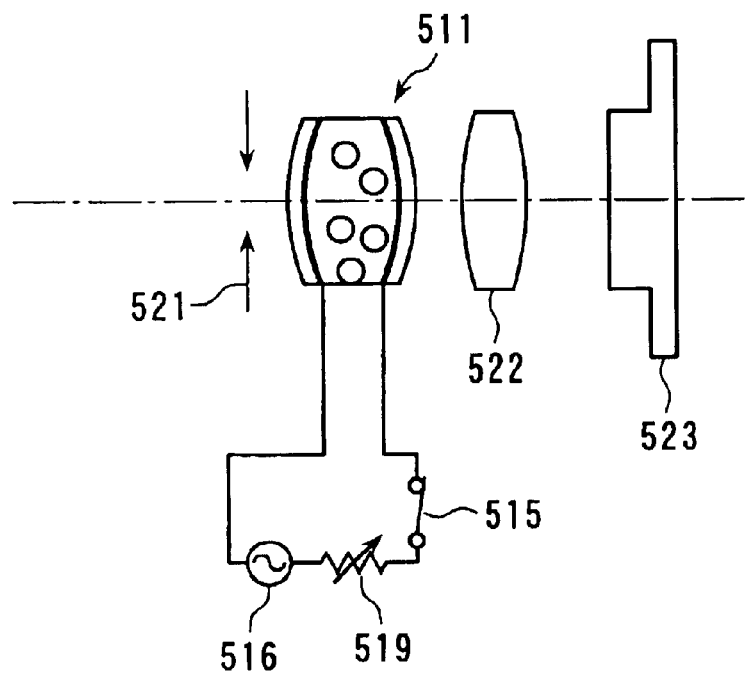
FIG. 25 shows construction of an imaging optical system for digital camera using a variable focal lens.

FIG. 25 shows an example where an imaging optical system for digital camera is constructed by using the variable focal lens. In this imaging optical system, an image of object (not shown) is formed on a solid-state imaging device 523 for example of CCD through an iris 521, variable focal lens 511, and lens 522. An illustration of liquid crystal molecule is omitted in FIG. 25. In such imaging optical system, AC voltage to be applied on the high-molecular dispersed liquid crystal layer 514 of the variable focal lens 511 is regulated by the variable resistor 519 so as to vary the focal distance of the variable focal lens 511. It is thereby possible to continuously bring into focus for the object distances for example of infinity through 600 mm without moving the variable focal lens 511 and the lens 522 along the optical axis.

Figure 26:
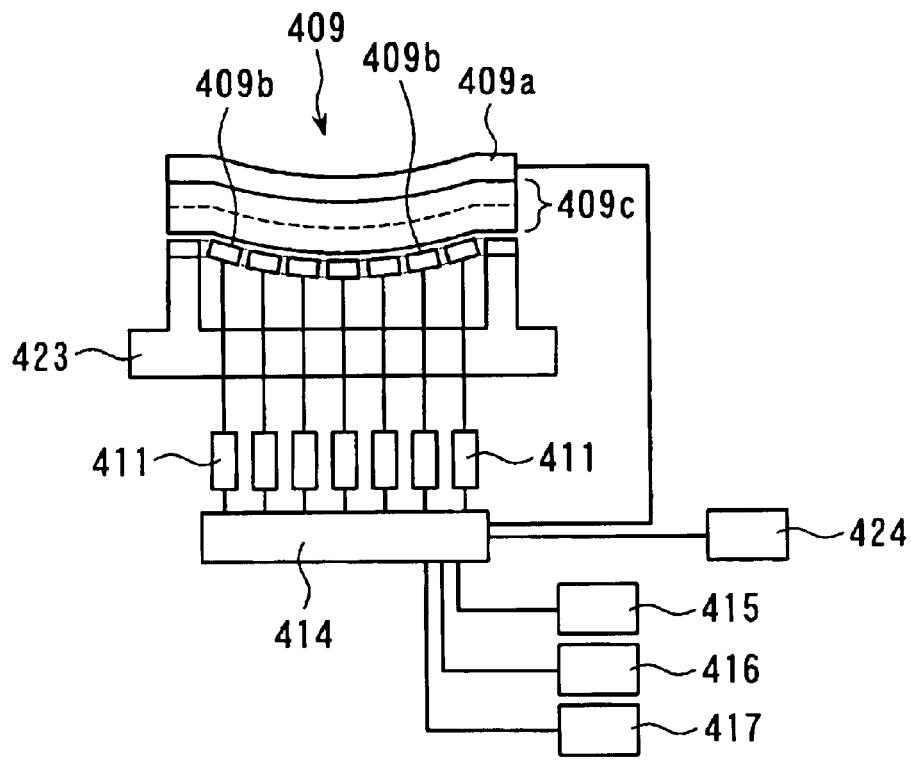
FIG. 26 schematically shows construction of a variable configuration mirror using a piezoelectric effect material.
Figure 27:
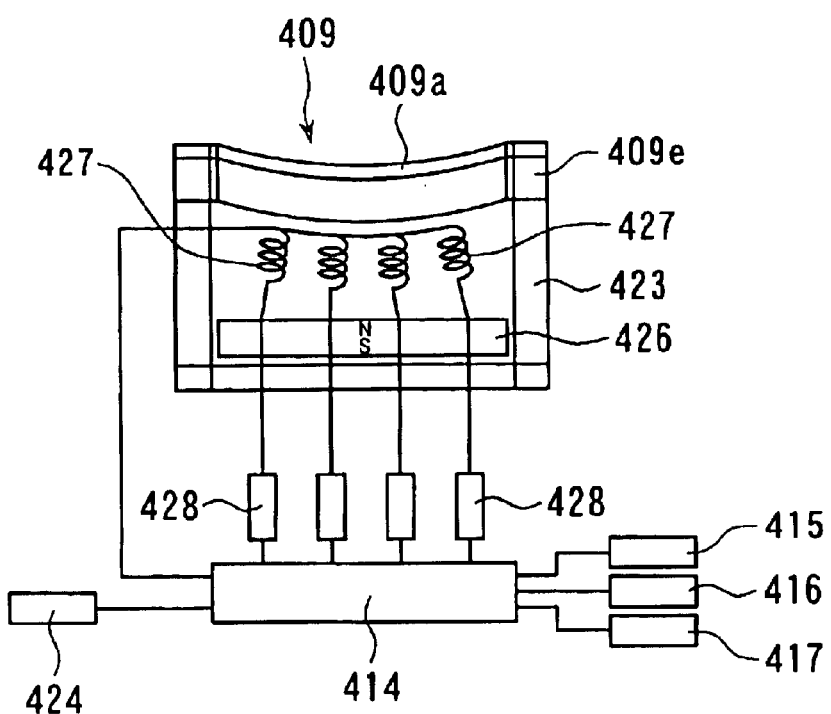
FIG. 27 schematically shows construction of a variable configuration mirror of the electromagnetic drive type.

Further, the variable configuration mirror shown in the above embodiments, in addition to one using electrostatic force, includes one to be driven by using a material having piezoelectric effect as shown in FIG. 26, and one to be driven by electromagnetic force as shown in FIG. 27. The variable configuration mirrors of such constructions can be similarly used. These will be described below.

FIG. 26 schematically shows an example of the variable configuration mirror 409 of which a mirror body formed by using a material having piezoelectric effect is to be driven. In the variable configuration mirror of this example, a piezoelectric device 409c is inserted between the reflecting surface 409a and the electrodes 409b for example of aluminum to thereby form a mirror body. The mirror body is disposed on a support 423. A partially varied expansion/contraction is then caused on the piezoelectric device 409c by changing the voltage to be applied on the piezoelectric device 409c by each electrode 409b so that the configuration of the mirror body can be changed. The configuration of electrodes 409b may be concentrically divided or divided into rectangles, and those of other suitable forms may also be selected.

In FIG. 26, numeral 424 denotes a movement sensor connected to an operational unit 414, for detecting movement in the digital camera. It causes the voltage applied to the electrodes 409b to be changed through the operational unit 414 and variable resistor 411 to change the configuration of the mirror body so as to compensate for disorder of image due to movement. At this time, focusing, temperature/humidity compensation, etc., are effected by at the same time considering the signals from the temperature sensor 415, humidity sensor 416, and distance sensor 417. In this case, since a stress resulting from the deformation of the piezoelectric device 409c is exerted on the reflecting film 409a, a certain degree of thickness is preferable for the reflecting film 409a so as to provide it with a suitable strength.

FIG. 27 schematically shows an example of the construction of the variable configuration mirror 409 to be driven by electromagnetic force. In the variable configuration mirror of this example, the configuration of the reflecting surface (mirror body) is made to be capable of being changed by using electromagnetic force. Specifically, a permanent magnet 426 is disposed on an internal bottom surface of the support 423, and a peripheral portion of a flexible board 409e for example of silicon nitride or polyimide is placed and fixed on a top surface of the support 423. A thin film 409a made of a metal coating for example of aluminum is provided on the outer surface of the flexible board 409e, and a plurality of coils 427 are disposed on a lower surface of the flexible board 409e. The mirror body is constructed by the flexible board 409e having the coils and the thin film 409a. The coils 427 are respectively connected to the operational unit 414 through drive circuits 428.

Accordingly, a suitable current is supplied to each coil 427 from the respective drive circuit 428 by output signals from the operational unit 414 corresponding to change in the optical system obtained at the operational unit 414 based on signals from each of the sensors 415, 416, 417, 424. Each coil 427 is thereby repulsed or drawn by an electromagnetic force acting between the permanent magnet 526 and itself so as to change the configuration of the mirror body consisting of the flexible board 409e and thin film 409a. In this case, currents of different values from each other can be applied to the coils 27. It is also possible to provide one coil 27 only or to provide coils 27 on an inner bottom side surface of the support 423 by attaching the permanent magnet 426 to the flexible board 409e. Further, the coils 427 are preferably made by such methods as lithography, and it is also possible to insert a core made of ferromagnetic material into the coil 427.

It should be noted that, while the eighth embodiment has been described as the case of using a charging type battery as the power supply, a throwaway dry cell can also be used. Further, it is also possible that a battery and a commercial power supply (AC 100V, 200V, etc.) can be used in combination.

As has been described by way of the above embodiments, it is possible according to the first aspect of the invention to achieve a reduction in size by combining the variable configuration mirror unit and lens and to readily retain the variable configuration mirror unit on the lens through a mirror retaining section so that an accuracy in the relative position of the lens and the variable configuration mirror unit can be improved. Also according to the first aspect, it is possible to achieve an optical apparatus for imaging apparatus where, at the same time of downsizing, an accuracy in relative position is achieved of the lens, variable configuration mirror unit and imaging device. Further according to the first aspect, by constituting a lens by a prism having a free curved surface formed at least on a portion thereof, a further downsizing of the optical apparatus can be achieved. Further according to the first aspect, by retaining the variable configuration mirror unit on the lens so that a reflecting surface thereof is concealed from outside, a shielding part exclusively for the reflecting surface of the variable configuration mirror unit becomes unnecessary and at the same time there is an advantage in its handling that such as the adhering of dust onto the reflecting surface of the variable configuration mirror unit is prevented. Further according to the first aspect, the lens retaining the variable configuration mirror unit can be readily positioned and retained within a protecting casing. Further according to the first aspect, the lens retaining the variable configuration mirror unit can be readily positioned and mounted on an imaging apparatus to which the optical apparatus is applied and at the same time it contributes to downsizing of the imaging apparatus. Further according to the first aspect, focusing can be effected at a relatively low power consumption and without causing a driving sound in the optical apparatus where downsizing is achieved and at the same time an accuracy in the relative position of the lens and the variable configuration mirror unit is improved. Further according to the first aspect, zoom ratio can be adjusted at a relatively low power consumption and without causing a driving sound in the optical apparatus where downsizing is achieved and at the same time an accuracy in the relative position of the lens and the variable configuration mirror unit is improved.

According to the second aspect of the invention, since two variable configuration mirrors and an imaging device are disposed in a manner shared by opposing two optical surfaces of a free curved surface prism, it is possible to achieve an imaging apparatus having the optical apparatus reduced in size and having an efficient layout. Further according to the second aspect, it can contribute to reduction in the thickness of the imaging apparatus. Further according to the second aspect, it is possible to obtain a downsized optical apparatus with effectively using the side on which an optical surface of a free curved surface prism is not formed.

According to the third aspect of the invention, an imaging apparatus having the optical apparatus reduced in size and having an efficient layout can be achieved, since a variable configuration mirror and imaging device are disposed in a manner shared by opposing two optical surfaces of a free curved surface prism.

According to the fourth and fifth aspects of the invention, a reduction in the thickness of the imaging apparatus can be achieved.

According to the sixth aspect of the invention, it is possible to achieve an imaging apparatus having the optical apparatus which is reduced in size and is capable of adjusting optical power by an efficient layout.

According to the second to sixth aspects of the invention, the optical apparatus can be placed vertically within the imaging apparatus so as to reduce the dimension of width of the imaging apparatus. Further according to the second to sixth aspects, the optical apparatus can be placed laterally within the imaging apparatus so as to reduce the dimension of height of the imaging apparatus. Further according to the second to sixth aspects, it is possible to effect focusing at a low power consumption and without producing a driving sound in the imaging apparatus which is reduced in size and thickness. Further according to the second to sixth aspects, it is possible to adjust optical power at a low power consumption and without producing a driving sound in the imaging apparatus which is reduced in size and thickness.

According to the seventh aspect of the invention, it is possible to achieve an imaging apparatus in which focusing can be concurrently effected even at the time of zoom adjustment.

According to the eighth aspect of the invention, it is possible to achieve an imaging apparatus in which an image taking with containing sound can be effected while effecting focusing or zoom adjustment.

According to the ninth aspect of the invention, it is possible to achieve an imaging apparatus in which focusing can be concurrently effected while displaying taken images.

According to the tenth aspect of the invention, it is not necessary to turn on electricity for the variable optical characteristic optical device if focusing is not to be effected while displaying taken images so that a further reduction in power consumption can be achieved.

According to the eleventh aspect of the invention, since the configuration of the variable optical characteristic optical device is rapidly changed, it is possible to achieve an optical apparatus which is capable of effecting standard image taking to macro image taking without a switching operation to a macro mode.

According to the twelfth aspect of the invention, an optical apparatus reduced in size and weight can be achieved, since it does not require mechanical members for the replacing of battery due to the fact that a charging type battery is disposed integrally within the apparatus body.

What is claimed is:

1. An imaging apparatus having an optical apparatus for imaging, said optical apparatus comprising: a first and second variable configuration mirrors each capable of being changed in the configuration of a reflecting surface thereof upon turning on electricity; a free curved surface prism having two opposite surfaces thereof serving as optical surface; and an imaging device for receiving a light introduced by said first and second variable configuration mirrors and the free curved surface prism, wherein said first variable configuration mirror for reflecting light incident on a front side of the imaging apparatus body being provided on a first optical surface of the optical surfaces of the free curved surface prism facing a rear side of the imaging apparatus body;

said second variable configuration mirror for further reflecting the reflected light by said first variable configuration mirror being provided on a second optical surface of the optical surfaces of said free curved surface prism facing the front side of the imaging apparatus body; and said imaging device for receiving the reflected light by said second variable configuration mirror being provided on the first optical surface of said free curved surface prism side by side in an up and down direction with said first variable configuration mirror.

2. The imaging apparatus according to claim 1, wherein at least one of said first and second variable configuration mirrors is provided so that the plane containing an outer periphery of the reflecting surface thereof is substantially vertical to a bottom plane of a imaging apparatus body.

3. The imaging apparatus according to claim 1, wherein the imaging surface of said imaging device is disposed in a manner inclined toward a vertical direction with respect to a bottom plane of the imaging apparatus body.

4. The imaging apparatus according to claim 1, wherein an electrical board is provided between said imaging device and an outer armor on the rear side of said imaging apparatus body.

5. The imaging apparatus according to claim 1, wherein an electrical board having a driving circuit of at least one of said first or second variable configuration mirror thereon is provided on said free curved surface prism on a side without an optical surface being formed.

6. An imaging apparatus having an optical apparatus for imaging, said optical apparatus comprising: a variable configuration mirror capable of being changed in the configuration of a reflecting surface thereof upon turning on electricity; a free curved surface prism having two opposite surfaces thereof serving as optical surface; and an imaging device for receiving a light introduced by said variable configuration mirror and the free curved surface prism, wherein said variable configuration mirror for reflecting light incident on a front side of the imaging apparatus body is provided on a first optical surface of the optical surfaces of said free curved surface prism facing a rear side of said imaging apparatus body; and said imaging device for receiving the reflected light by said variable configuration mirror is provided on a second optical surface facing the front side of said imaging apparatus body.

7. The imaging apparatus according to claim 6, wherein the imaging surface of said imaging device is disposed substantially vertical to a bottom plane of the imaging apparatus body.

8. An imaging apparatus having an optical apparatus for imaging, said optical apparatus comprising: a first and second variable configuration mirrors each capable of being changed in the configuration of a reflecting surface thereof upon turning on electricity; a lens; and an imaging device for effecting photoelectric conversion of a light formed into an image by said first and second variable configuration mirrors and the lens, wherein a light incident on a front side of the imaging apparatus body is reflected substantially vertically by said first variable configuration mirror, and said reflected light by said first variable configuration mirror being further reflected toward a rear side of said imaging apparatus body by said second variable configuration mirror; and said imaging device for receiving the reflected light by said second variable configuration mirror being provided so as to be at the rear side of said imaging apparatus body.

9. An imaging apparatus having an optical apparatus for imaging, said optical apparatus comprising: a first and second variable configuration mirrors each capable of being changed in the configuration of a reflecting surface thereof upon turning on electricity; a lens; and an imaging device for effecting photoelectric conversion of a light formed into an image by said first and second variable configuration mirrors and the lens, wherein a light incident on a front side of the imaging apparatus body is reflected substantially vertically by said first variable configuration mirror, and said reflected light by said first variable configuration mirror being further reflected toward the front side of said imaging apparatus body by said second variable configuration mirror; and said imaging device for receiving the reflected light by said second variable configuration mirror being provided so as to be at the front side of said imaging apparatus body.

10. The imaging apparatus according to claim 9, wherein the imaging surface of said imaging device is disposed so as to be substantially vertical to a bottom plane of the imaging apparatus body.

11. The imaging apparatus according to claim 8, wherein said lens is provided in an optical path between said first and second variable configuration mirrors.

12. The imaging apparatus according to claim 9, wherein said lens is provided in an optical path between said first and second variable configuration mirrors.

13. An imaging apparatus having an optical apparatus for imaging, said optical apparatus comprising: a first and second variable configuration mirrors each capable of being changed in the configuration of a reflecting surface thereof upon turning on electricity; a free curved surface prism having two opposite surfaces thereof serving as optical surface; and an imaging device for receiving a light introduced by said first and second variable configuration mirrors and the free curved surface prism, wherein said first variable configuration mirror being disposed so as to reflect light incident on a front side of the imaging apparatus body onto a first optical surface of the optical surfaces of said free curved surface prism facing a rear side of the imaging apparatus body, said second variable configuration mirror being disposed onto said first optical surface so that the light reflected by said first variable configuration mirror and then further reflected by a second optical surface of the optical surfaces of said free curved surface prism facing the front side of the imaging apparatus body is reflected toward the front side of the imaging apparatus body; and said imaging device is disposed so as to receive the reflected light reflected onto said second optical surface by said second variable configuration mirror.

14. The imaging apparatus according to any one of claims 1, 6, 8, 9 and 13, wherein said optical apparatus is disposed so that a plane containing an incident optical axis to said optical apparatus and an incident optical axis to the imaging device is vertical to the bottom plane of the imaging apparatus body.

15. The imaging apparatus according to any one of claims 1, 6, 8, 9 and 13, wherein said optical apparatus is disposed so that a plane containing an incident optical axis to said optical apparatus and an incident optical axis to the imaging device is parallel to the bottom plane of the imaging apparatus body.

16. The imaging apparatus according to any one of claims 1, 6, 8, 9 and 13, wherein said variable configuration mirror adjusts a focusing position by the configuration of said reflecting surface.

17. The imaging apparatus according to any one of claims 1, 8, 9 and 13, wherein said variable configuration mirror adjusts an optical power by the configuration of said reflecting surface.

* * * * *